US012726937B2

(12) United States Patent
Manolakos et al.

(10) Patent No.: US 12,726,937 B2
(45) Date of Patent: Sep. 1, 2026

(54) PEER ASSISTED REVISION OF POSITIONING ASSISTANCE DATA

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/554,697

(22) PCT Filed: May 2, 2022

(86) PCT No.: PCT/US2022/027259

§ 371 (c)(1),
(2) Date: Oct. 10, 2023

(87) PCT Pub. No.: WO2022/265731

PCT Pub. Date: Dec. 22, 2022

(65) Prior Publication Data

US 2024/0129884 A1 Apr. 18, 2024

(30) Foreign Application Priority Data

Jun. 14, 2021 (GR) .............................. 20210100386

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
CPC ......... H04W 4/02; H04W 8/24; H04W 24/10; H04W 64/00
See application file for complete search history.

(56) References Cited

U.S. PATENT DOCUMENTS

| | | | |
|---|---|---|---|
| 2020/0328861 | A1 | 10/2020 | Malladi et al. |
| 2021/0120517 | A1 | 4/2021 | Akkarakaran et al. |
| 2021/0160812 | A1 | 5/2021 | Manolakos et al. |

FOREIGN PATENT DOCUMENTS

| | | | |
|---|---|---|---|
| EP | 2555570 | A1 | 2/2013 |

OTHER PUBLICATIONS

International Search Report and Written Opinion—PCT/US2022/027259—ISA/EPO—Aug. 5, 2022.

*Primary Examiner* — Sam Bhattacharya
(74) *Attorney, Agent, or Firm* — Weaver Austin Villeneuve & Sampson LLP/QUALCOMM Incorporated

(57) ABSTRACT

A user equipment (UE) obtains assistance data for positioning from one or more sidelink connected UEs. Prior to sending the assistance data for positioning to the UE, the sidelink UE(s) revises the assistance data, e.g., by reprioritizing, reordering, or reducing the assistance data, or a combination thereof. By revising the assistance data the sidelink UE(s) provides the most pertinent assistance data to the UE, thereby increasing power savings for the UE. Where multiple sidelink UEs provide revised assistance data to the UE, the UE combines the revised assistance data, e.g., based on measurement information, range information, or priority of the sidelink UEs. If the UE has a connection to the location server, the UE obtains revised assistance data from sidelink UE(s) to avoid the need for an assistance data exchange with the location server during the positioning session, thereby improving latency.

34 Claims, 10 Drawing Sheets

PEER ASSISTED REVISION OF POSITIONING ASSISTANCE DATA

CROSS-REFERENCE TO RELATED APPLICATION

This application is a National Phase entry of International Application No. PCT/US2022/027259, filed May 2, 2022, entitled "PEER ASSISTED REVISION OF POSITIONING ASSISTANCE DATA", which claims priority to and the benefit of Greek patent application No. 20210100386, entitled "PEER ASSISTED REVISION OF POSITIONING ASSISTANCE DATA," filed Jun. 14, 2021, both of which are assigned to the assignee hereof and expressly incorporated herein by reference in their entirety.

BACKGROUND

Field

The subject matter disclosed herein relates generally to the field of wireless communications, and more specifically to positioning of a User Equipment (UE) in a wireless network.

Information

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication system, in the absence of support from a Global Navigation Satellite System (GNSS) such as GPS, GLONASS or Galileo. For example, this may apply for a mobile device that is indoors or in a dense urban canyon when tracking of the mobile device is needed for such applications as navigation assistance, public safety support or management of moving objects in a factory or warehouse. In such cases, a non-GNSS means of reliably and quickly locating a mobile device may be of value. Power efficiencies and low latencies during positioning services are likewise desirable.

SUMMARY

A user equipment (UE) obtains revised assistance data for positioning from one or more sidelink connected UEs. The sidelink UE(s) obtains assistance data and prior to sending the assistance data for positioning to the UE, the sidelink UE(s) revise the assistance data, e.g., by reprioritizing, reordering, or reducing the assistance data, or a combination thereof. Revision of the assistance data, for example, prioritizes the most pertinent assistance data for the UE and may reduce the amount of assistance data to be received by the UE, thereby increasing power savings. Where multiple sidelink UEs provide revised assistance data to the UE, the UE combines the revised assistance data, e.g., based on measurement information, such as signal strength or range information associated with the revised assistance data. The UE may additionally or alternatively combine multiple sets of revised assistance data based on the priority of the sidelink UEs, e.g., revised assistance data from a relay UE or sidelink UE that is associated with or paired with the UE may be given priority over other sidelink UEs. If the UE has a connection to the location server, the UE may obtain revised assistance data from sidelink UE(s) to avoid the need for an assistance data exchange with the location server during the positioning session, thereby improving latency.

In one implementation, a method performed by a first user equipment (UE) for determining a position of a second UE, includes receiving from the second UE through a sidelink channel a request for assistance data for positioning the second UE; obtaining assistance data for positioning; revising the assistance data for positioning to produce revised assistance data; and sending to the second UE through the sidelink channel the revised assistance data for positioning the second UE.

In one implementation, a first user equipment (UE) configured for determining a position of a second UE, includes at least one wireless transceiver configured to wirelessly communicate with other entities in a wireless network; at least one memory; and at least one processor coupled to the at least one wireless transceiver and the at least one memory and configured to: receive from the second UE through a sidelink channel a request for assistance data for positioning the second UE; obtain assistance data for positioning; revise the assistance data for positioning to produce revised assistance data; and send to the second UE through the sidelink channel the revised assistance data for positioning the second UE.

In one implementation, a first user equipment (UE) configured for determining a position of a second UE, includes means for receiving from the second UE through a sidelink channel a request for assistance data for positioning the second UE; means for obtaining assistance data for positioning; means for revising the assistance data for positioning to produce revised assistance data; and means for sending to the second UE through the sidelink channel the revised assistance data for positioning the second UE.

In one implementation, a non-transitory storage medium including program code stored thereon, the program code is operable to configure at least one processor in first user equipment (UE) for determining a position of a second UE, the program code comprising instructions to: receive from the second UE through a sidelink channel a request for assistance data for positioning the second UE; obtain assistance data for positioning; revise the assistance data for positioning to produce revised assistance data; and send to the second UE through the sidelink channel the revised assistance data for positioning the second UE.

In one implementation, a method performed by a first user equipment (UE) for determining a position of the first UE, includes sending to a second UE through a first sidelink channel a request for assistance data for positioning; receiving from the second UE through the first sidelink channel a first set of revised assistance data for positioning, wherein the first set of revised assistance data is generated by the second UE based on assistance data for positioning obtained by the second UE; and performing positioning based on the first set of revised assistance data.

In one implementation, a first user equipment (UE) configured for determining a position of the first UE, includes at least one wireless transceiver configured to wirelessly communicate with entities in a wireless network; at least one memory; and at least one processor coupled to the at least one wireless transceiver and the at least one memory and configured to: send to a second UE through a first sidelink channel a request for assistance data for positioning; receive from the second UE through the first sidelink channel a first set of revised assistance data for positioning, wherein the first set of revised assistance data is generated by the second UE based on assistance data for positioning obtained by the second UE; and perform positioning based on the first set of revised assistance data.

In one implementation, a first user equipment (UE) configured for determining a position of the first UE, includes means for sending to a second UE through a first sidelink channel a request for assistance data for positioning; means for receiving from the second UE through the first sidelink channel a first set of revised assistance data for positioning, wherein the first set of revised assistance data is generated by the second UE based on assistance data for positioning obtained by the second UE; and means for performing positioning based on the first set of revised assistance data.

In one implementation, a non-transitory storage medium including program code stored thereon, the program code is operable to configure at least one processor in a first user equipment (UE) for determining a position of the first UE, the program code comprising instructions to: send to a second UE through a first sidelink channel a request for assistance data for positioning; receive from the second UE through the first sidelink channel a first set of revised assistance data for positioning, wherein the first set of revised assistance data is generated by the second UE based on assistance data for positioning obtained by the second UE; and perform positioning based on the first set of revised assistance data.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
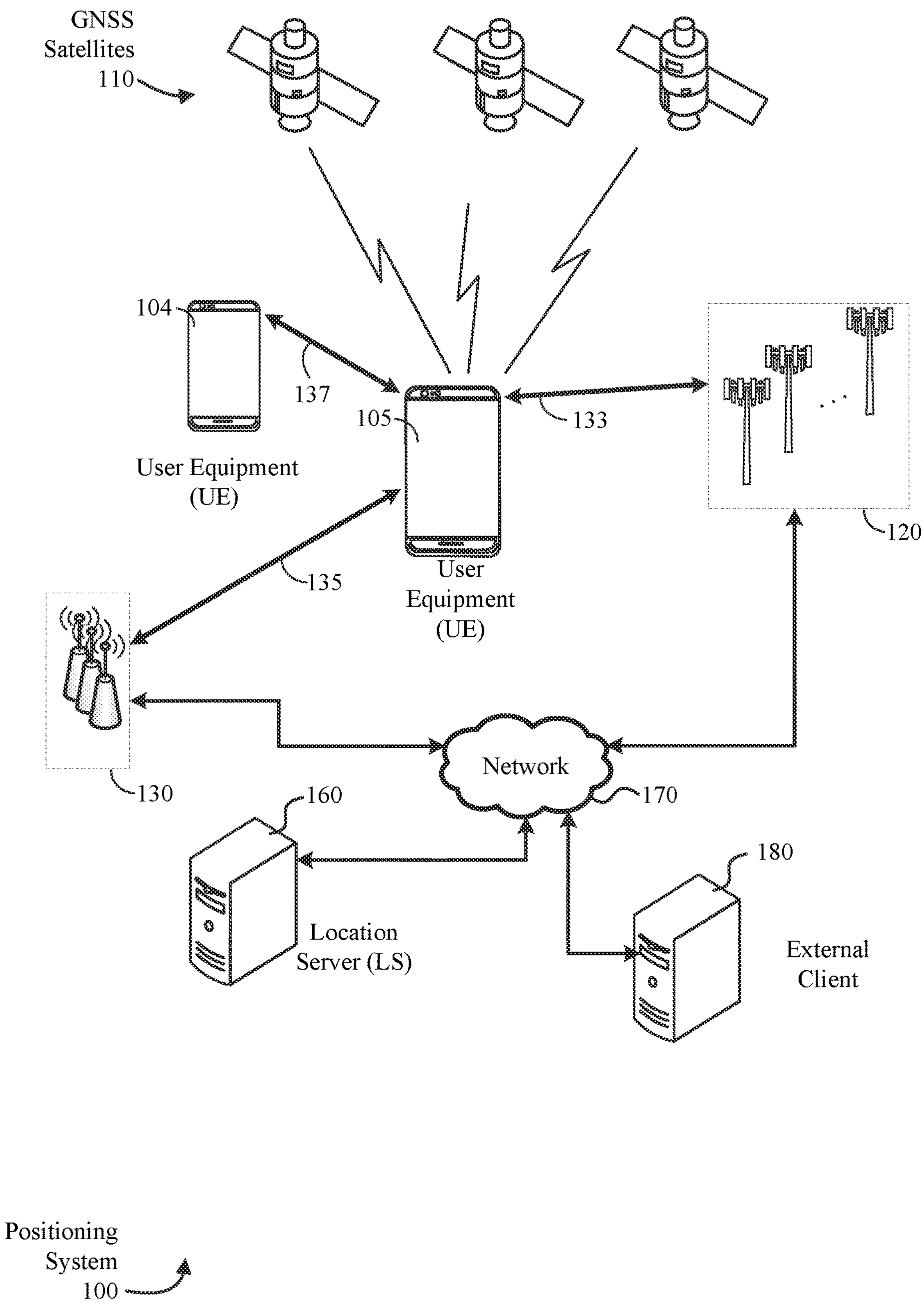
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 210 may be indicated as 210-1, 210-2, 210-3 etc. or as 210*a*, 210*b*, 210*c*, etc. When referring to such an element using only the first number, any instance of the element is to be understood (e.g., element 210 in the previous example would refer to elements 110-1, 210-2, and 210-3 or to elements 210*a*, 210*b*, and 210*c*).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "one or more processors configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for the Global Navigation Satellite System (GNSS), Time Difference Of Arrival (TDOA), Angle of Departure (AoD), Round-Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

A location server and a base station (e.g. an eNodeB (eNB) for LTE access or an NR NodeB (gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (which may be referred to as NPPa or NRPPa) protocol may be used to transfer such messages between a base station that is a gNodeB and a location server that is an LMF.

During positioning using signaling in LTE and 5G NR, a UE typically acquires dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Other types of signals, i.e., signals that are not dedicated for positioning, may be used by the UE for positioning. Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/Rel. 16 SRS for positioning | UE Rx-Tx time difference | Multi-RTT |
| Rel. 15 SSB/CSI-RS for RRM | SS-RSRP (RSRP for RRM), SS-RSRQ (for RRM), CSI-RSRP (for RRM), CSI-RSRQ (for RRM) | E-CID |

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TS s OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR, and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

Positioning procedures, e.g., in the NG-RAN, are modelled as transactions of the LPP protocol. A procedure, for example, consists of a single operation of one of the following types: exchange of positioning capabilities; transfer of assistance data; transfer of location information (positioning measurements and/or position estimate); error handling; and abort.

Thus, for example, during a positioning session, a UE may report its capabilities to process reference signals, such as PRS, in the exchange of positioning capabilities. The UE may receive positioning assistance data to perform PRS measurements in the transfer of assistance data. The assistance data provided to the UE, however, may include configurations for significantly more PRS resources than the UE is capable of processing. For example, a UE may be capable of processing only up to 5 PRS resources, but the positioning assistance data provided to the UE may include 20 PRS resources to be measured by the UE. When a UE is configured in the assistance data of a positioning method with a number of PRS resources beyond the UE's capability, the UE may assume that the DL-PRS Resources in the assistance data are sorted in a decreasing order of measurement priority, and accordingly, may select the first N PRS resources for processing, where N is the number of PRS resources that the UE is capable of processing (e.g., the first 5 PRS resources from the above example).

For example, per 3GPP TS 38.214, "Within a positioning frequency layer, the DL PRS resources are sorted in the decreasing order of priority for measurement to be performed by the UE, with the reference indicated by nr-DL-PRS-ReferenceInfo being the highest priority for measurement, and the following priority is assumed: Up to 64 dl-PRS-IDs of the frequency layer are sorted according to priority; Up to 2 DL PRS resource sets per dl-PRS-ID of the frequency layer are sorted according to priority.

Thus, a UE may receive significantly more assistance data for positioning than is necessary or even possible for the UE to measure. This may have a significant power and latency impacts on some UEs, particularly UEs with low power and limited capabilities, such as "light" or "low-tier" UEs, such as wearable devices (e.g., smart watches), relaxed/narrowband IoT devices, low-end mobile phones, and the like. Further, while the assistance data prioritizes the assistance data for measurements in decreasing order, the higher priority PRS may not be the best PRS for the UE to measure, e.g., the UE may not be able to measure them or measurements of other PRS may provide better results.

In an implementation discussed herein, a first UE that is in sidelink communication with one or more sidelink UEs may obtain assistance data for positioning through the sidelink UEs. Each sidelink UE may revise the assistance data, such as reprioritizing or reordering the assistance data or reducing the assistance data, or a combination thereof, before sending the revised assistance data to the first UE and the first UE may perform positioning measurements using the revised assistance data. Where multiple sidelink UEs provide revised assistance data to the first UE, the sidelink UEs may provide additional information, such as signal strength information, range data between the first UE and the sidelink UE (such as zone ID for the sidelink UE), etc., which the first UE may use to select the revised assistance data to use during positioning. In implementations, in which the first UE has a connection to a location server through a base station, the first UE may obtain revised assistance data via the sidelink UEs, e.g., prior to a positioning session, and may engage in a positioning session with the location session without an assistance data exchange with the location server. Accordingly, the first UE may receive the most pertinent assistance data for positioning from the sidelink UEs with reduced latency and increased power savings.

FIG. 1 is a simplified illustration of a positioning system 100 in which a UE 105, location server 160, and/or other components of the positioning system 100 can use the techniques provided herein for determining an estimated location of UE 105, according to one implementation. The techniques described herein may be implemented by one or more components of the positioning system 100. The positioning system 100 can include a UE 104 which is in sidelink (SL) communication with another UE 105, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. The UE 104 may be in communication with the base stations 120, access points 130, location server 160, etc. in the same manner as UE 105, and, thus, the UEs 104 and 105 may be the same type of UEs. Accordingly, unless indicated otherwise, it should be understood that the following discussion referring to UE 105 may be similarly applicable to UE 104. In other implementations, the UE 104 may only be in sidelink communication with the UE 105, but may connect to the network 170, location server 160 and external client 180 through UE 105. For example, the UE 104 may be a "low-tier" UE, with lower power and limited capabilities compared to UE 105, such as wearable devices (e.g., smart watches), relaxed/narrowband IoT devices, low-end mobile phones, and the like, while UE 105 may be a "premium" UE with higher power and increased capabilities compared to UE 104.

The positioning system 100 may estimate the location of the UEs 104 and 105 based on RF signals received by and/or sent from the UEs and known locations of other components (e.g., GNSS satellites 110, base stations 120, APs 130, sidelink UEs) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only UE 104 and UE 105 are illustrated, it will be understood that many UEs (e.g., hundreds, thousands, millions, etc.) may utilize the positioning system 100, and that UE 104 may be in SL communication with a number of UEs in the positioning system. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135. Additionally, the sidelink connected UEs 104 and 105 may send and receive information directly using a third communication link 137.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UEs 104 and/or 105 may be based on measurements of RF signals sent from and/or received by the UEs 104 and/or 105. In particular, these measurements can provide information regarding the relative distance and/or angle of the UE from one or more components in the positioning system 100 (e.g., GNSS satellites 110, APs 130, base stations 120 or other sidelink UEs). The estimated location of the UE can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 104 may be estimated at least in part based on measurements of RF signals communicated between UE 104 and UE 105 and one or more other UEs (not shown in FIG. 1), which may be mobile. Direct communication between peer UEs in this manner may comprise PC5 sidelink, and/or similar Device-to-Device (D2D) communication technologies. Sidelink, which is defined by 3GPP, is a form of D2D communication under the cellular-based LTE and NR standards. All direct communications between UEs are referred to herein as sidelink communications.

An estimated location of a UE can be used in a variety of applications—e.g. to assist direction finding or navigation for a user of the UE or to assist another user (e.g. associated with external client 180) to locate UE. A "location" is also referred to herein as a "location estimate", "estimated location", "location", "position", "position estimate", "position fix", "estimated position", "location fix" or "fix". A location of the UE may comprise an absolute location of the UE (e.g. a latitude and longitude and possibly altitude) or a relative location of the UE (e.g. a location expressed as distances north or south, east or west and possibly above or below some other known fixed location or some other location such as a location for the UE at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which the UE is expected to be located with some level of confidence (e.g. 95% confidence).

The external client 180 may be a web server or remote application that may have some association with UEs 104 or 105 (e.g. may be accessed by a user of UE 104 or 105) or may be a server, application, or computer system providing a location service to some other user or users which may include obtaining and providing the location of UE 104 or 105 (e.g. to enable a service such as friend or relative finder, asset tracking or child or pet location). Additionally or alternatively, the external client 180 may obtain and provide the location of UE 104 or 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
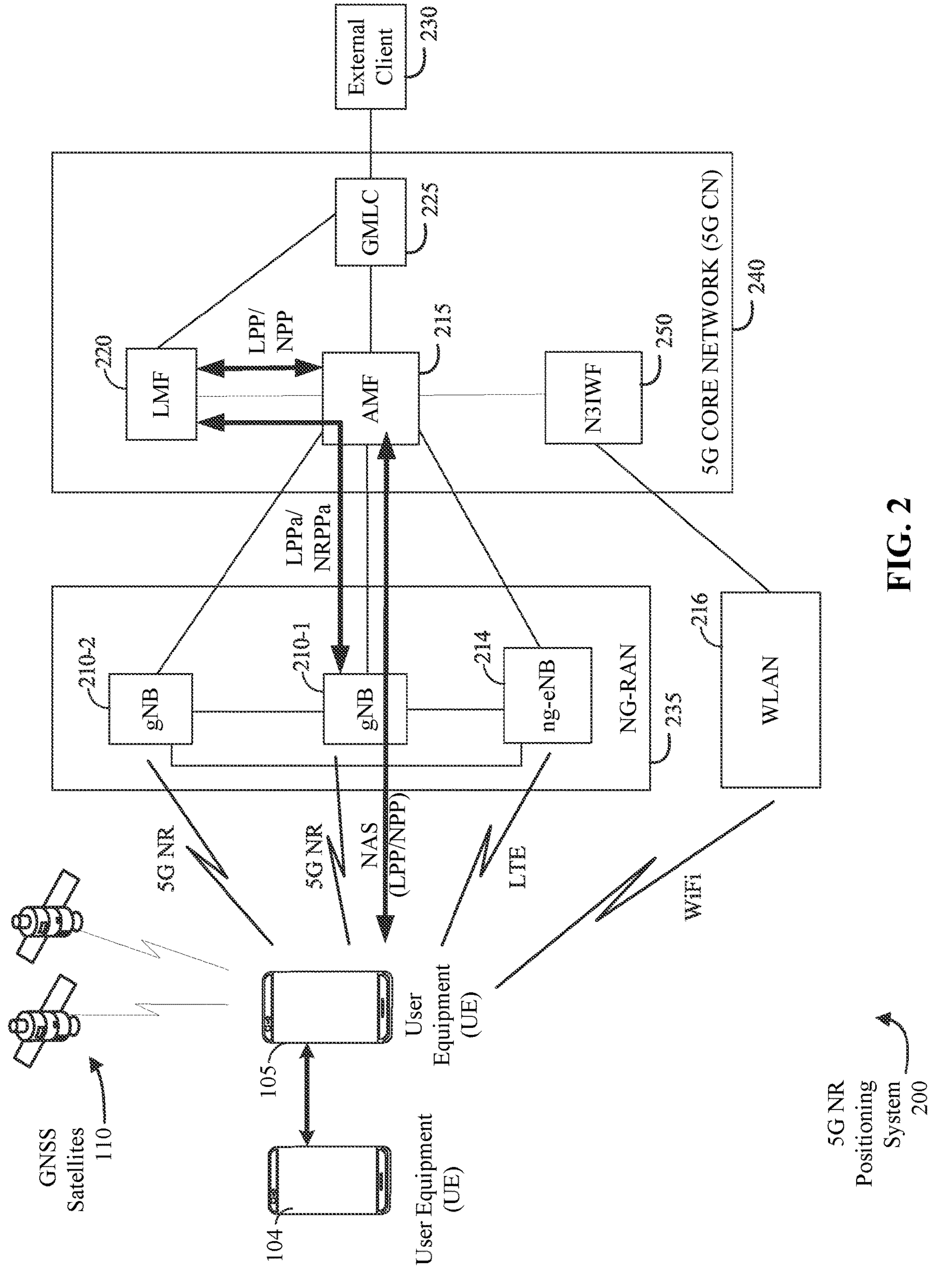
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 104, UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP.

Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components. As discussed above, the UE 104 may be in communication with the 5G CN 240 via the NG-RAN 235 in addition to being in sidelink communication with the UE 105 or may only be in sidelink communication with the UE 105. Accordingly, only stated otherwise the following discussions referring to UE 105 should be understood to likewise be applicable to UE 104 in some or all implementations.

It should be noted that FIG. 2 provides only a generalized illustration of various components, any or all of which may be utilized as appropriate, and each of which may be duplicated or omitted as necessary. Specifically, although only UE 104 and UE 105 are illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, the UE 105 may correspond to a cellphone, smartphone, laptop, tablet, personal data assistant (PDA), tracking device, navigation device, Internet of Things (IoT) device, or some other portable or moveable device. In some implementations, the UE 104 may be a low-tier UE, such as wearable devices (e.g., smart watches), relaxed/narrowband IoT devices, low-end mobile phones, and the like, with lower power and limited capabilities compared to UE 105, which may be a "premium" UE with higher power and increased capabilities compared to UE 104. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210 communicate with the UE 105, e.g., via a Universal Mobile Telecommunications Service (UMTS) air interface or "Uu interface." Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and positioning of UE 104 when UE 104 is in sidelink communication with UE 105 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 104 and/or 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 104 or 105 (e.g., by processing downlink reference signals, such as DL positioning reference signals (DL-PRS) transmitted by wireless nodes such as gNBs 210, ng-eNB 214 and/or WLAN 216, and/or using assistance data provided to the UE 104 or 105, e.g., by LMF 220). The UE 104 or 105 may additionally transmit uplink reference signals, sometimes referred to as uplink PRS or UL sounding reference signals (SRS) for positioning, which may be received by wireless nodes such as gNBs 210, ng-eNB 214 and/or WLAN 216 and may be referred to as uplink SRS (UL-SRS) or UL-PRS, or which may be received by UEs 104 or 105 in sidelink and may be referred to as sidelink SRS (SL-SRS) or SL-PRS. It should be understood that PRS and SRS are examples of reference signals that may be used for positioning, but that other reference signals may be used if desired.

The Gateway Mobile Location Center (GMLC) 225 may support a location request for the UEs 104 and/or 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), RTT, Reference Signal Receive Power (RSRP), Reference Signal Received Quality (RSRQ), Time of Arrival (ToA), AoA, Differential AoA (DAoA), AoD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AoA, AoD, ToA) may use RF reference signals received from base stations 210 and 214. These signals may comprise PRS, which can be used, for example, to execute TDOA, AoD, and RTT-based positioning of the UE 105. Other reference signals that can be used for positioning may include Cell-specific Reference Signal (CRS), Channel State Information Reference Signal (CSI-RS), synchronization signals (e.g., Synchronization Signal Block (SSB) Synchronizations Signal (SS)), etc. Moreover, the signals may be transmitted in a Tx beam (e.g., using beamforming techniques), which may impact angular measurements, such as AoD. Additionally or alternatively, the UE 105 may transmit uplink reference signals, such as UL-SRS, which are received by base stations 210 or 214 used for positioning, such as TDOA, AoA, and RTT. The 5G native positioning technologies supported in 5G NR, for example, include DL-only, UL-only and a combination of DL and UL (DL+UL) positioning methods. For example, DL based positioning technologies include DL Time Difference of Arrival (DL-TDOA) and DL Angle of Departure (DL-AoD). UL based positioning technologies include UL Time Difference of Arrival (UL-TDOA) and UL Angle of Arrival (UL-AoA). A combination of DL and UL (DL+UL) based positioning technologies include round-trip time (RTT) with one or more neighboring base stations (multi-RTT). In addition, Enhanced Cell-ID (E-CID) based on radio resource management (RRM) measurements is supported in 5G NR Rel-16. Additionally, or alternatively, the UEs 104 and 105 may transmit sidelink reference signals, such as SL-SRS, which are received by other UEs in sidelink and used for positioning.

Figure 3:
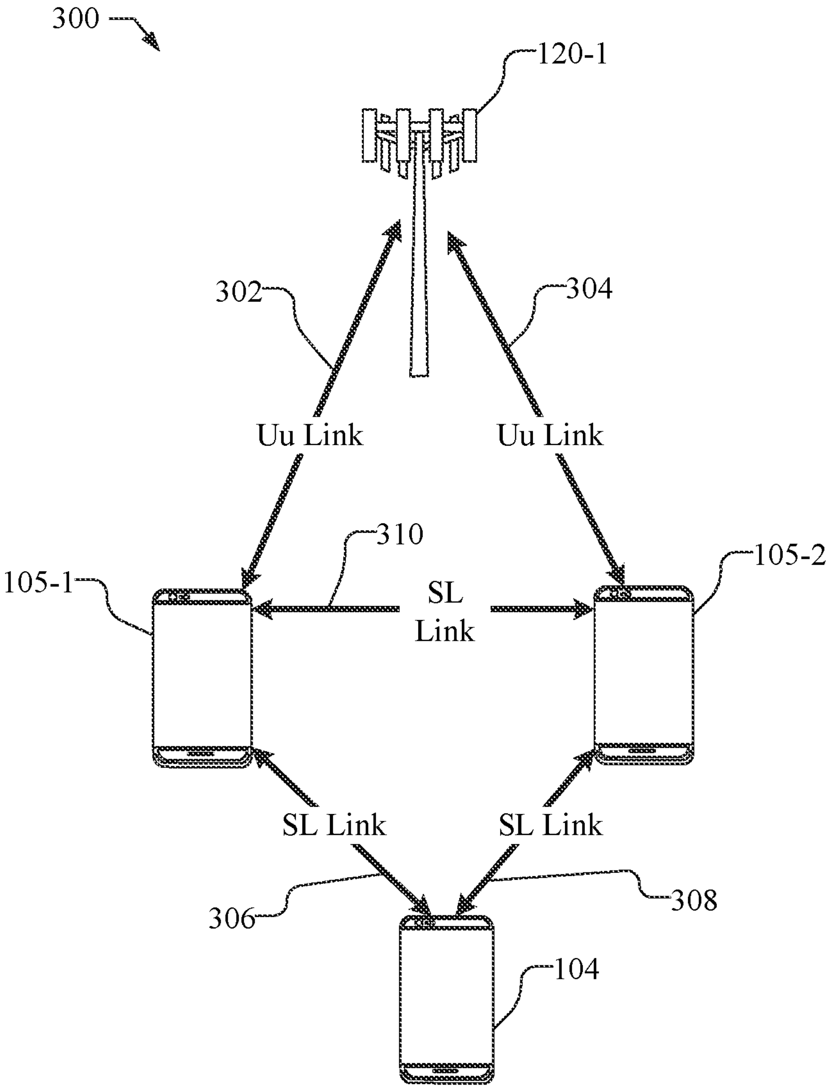
FIG. 3 is a diagram illustrating a simplified environment including a UE that is connected to multiple sidelink UEs via a sidelink channel, and the sidelink UEs are connected to a base station.

FIG. 3 is a diagram illustrating a simplified environment 300 including a base station 120-1 (which may correspond to one of base station 120*s* of FIG. 1 and/or gNBs 210 and/or ng-eNB 214 of FIG. 2), multiple UEs 105-1 and 105-2, and a UE 104. As illustrated, the UEs 105-1 and 105-2 are connected to the positioning system, e.g., illustrated by base station 120-1, via Uu links 302 and 304. UE 104 is not connected to the base station 120-1, but is in connected to UEs 105-1 and 105-2 via sidelink links 306 and 308. The UEs 105-1 and 105-2 are illustrated as being in direct communication with each other via sidelink link 310. UEs 105-1 and 105-2 may sometimes be collectively referred to herein as UEs 105.

UEs 105 each have a direct connection to a positioning system, such as 5G CN 240 shown in FIG. 2 and may each engage in a positioning session with a location server, e.g., LMF 220, via the base station 1201. UE 104, on the other hand, does not have a direct connection to the base station 120-1, and thus, a positioning session for the UE 104 is conducted through a sidelink connection, e.g., through UE 105-1, which may serve as a relay UE for the UE 104. A positioning session for the UE 104 may use downlink reference signals from the base station 120-1 (as well as other base stations), e.g., DL PRS, and/or sidelink reference signals from one or more of UEs 105-1 and 105-2 (as well as other sidelink UEs).

During a positioning session for the UE 104, assistance data may be transferred to the UE 104 from one or both UEs 105 via the sidelink links 306 and 308. For example, one or both of the UEs 105 may obtain positioning assistance data from a location server via the base station 120-1 or may generate assistance data, e.g., for SL positioning, for the UE 104. The UEs 105 may receive positioning assistance data specifically for the UE 104 or may receive positioning assistance data for their own positioning sessions with the location server. One or both of the UEs 105 may provide the assistance data for positioning to the UE 104. The assistance data for positioning, for example, may include one or both of downlink reference signal assistance data and sidelink reference signal assistance data. Downlink reference signal assistance data, for example, may include at least one of DL-PRS resources, resource sets, frequency layers, or a combination thereof from one or more base stations, e.g., gNBs or TRPs, such as base station 120-1. Sidelink reference signal assistance data may include at least one of SL-PRS resources, resource sets, frequency layers, or a combination thereof from one or more sidelink UEs, such as UEs 105.

Simply forwarding assistance data for positioning from UEs 105 to the UE 104, however, may be an inefficient use of power. For example, as discussed above, assistance data for positioning may include significantly more reference signal resources than a UE, such as UE 104, may be capable of processing. Moreover, assistance data for positioning may be prioritized by the location server, e.g., by the order in which the reference signal resources are listed in the assistance data, or by a prioritization identifier (ID). The high priority reference signal resources in the assistance data, however, may not be the best reference signals for the UE 104 to measure, e.g., the UE 104 may not be capable of measuring the high priority reference signal resources or other reference signal resources may provide better measurements due to UE 104 capabilities or environmental conditions, such as blockage conditions.

Accordingly, UEs 105 may revise the assistance data for positioning before providing the revised assistance data to the UE 104 and the UE 104 may use the revised assistance data for positioning, e.g., generating positioning measurements. The UEs 105 may revise the assistance data by excluding or de-prioritizing reference signals from the assistance data that have weak signals or that cannot be measured by the UE 104 due to capabilities or environmental conditions. For example, the UEs 105 may revise the assistance data by reprioritizing, reordering the assistance data or reducing the assistance data, or a combination thereof, before sending the revised assistance data to UE 104. Reprioritizing the assistance data, for example, may include assigning new prioritization identifiers (IDs) to assistance data. Reordering the assistance data may be used to adjust the prioritization of the assistance data, when assistance data is prioritized by listing the assistance data according to priority. Reducing the assistance data may be used, e.g., to remove assistance data that the UE 104 may not measure due to capabilities or environmental conditions.

The UEs 105 may revise the assistance data based on the reference signal measurements performed by the UEs 105. For example, in some implementations, the UEs 105 may measure a signal strength parameter of the reference signals, such as Reference Signal Receive Power (RSRP), Received Signal Strength Indication (RSSI), Reference Signal Received Quality (RSRQ), Signal to Noise Ratio (SNR), etc., and may provide the signal strength parameter to the UE 104 with the revised assistance data.

In some implementations, one or both of the UEs 105 may further obtain an indication of range between the respective UE 105-1 or 105-2 and the UE 104, and may provide the indication of the range to the UE 104 with the revised assistance data. For example, in one implementation, the indication of range may be a Zone ID for UE 105-1 or UE 105-2. A Zone ID, for example, is calculated by each SL UE, e.g., based on its geodesic distance in longitude and latitude to a geographic coordinate (0,0), and a configured zone length, and is broadcast/unicast to nearby UEs as part of sidelink control information. For example, sidelink transmission information is included in a sidelink control information (SCI) messages for a sidelink shared channel (SL-SCH) transmission. The sidelink transmission information includes Sidelink Hybrid Automatic Repeat request (HARQ) information including new data indicator (NDI), redundancy version (RV), Sidelink process ID, HARQ feedback enabled/disabled indicator, Sidelink identification information including cast type indicator, Source Layer-1 ID and Destination Layer-1 ID, CSI request, a priority, a communication range requirement, and the Zone ID. An approximate distance or range between the UE 104 and each of the UEs 105 may be determined by the UE 104 based on the Zone IDs for each of the UEs 105 and the Zone ID associated with UE 104. The UEs 104 and 105, for example, may determine their Zone IDs based on rough estimate of locations that may be previously acquired. Other range indicators may include, e.g., an RTT measurement between each of the UEs 105 and the UE 104.

The UE 104 may use information received from one or both UEs 105 along with the revised assistance data to determine which reference signal resources to measure. For example, the UE 104 may use the measured reference signal parameters provided by one or both UEs 105, such as the signal strength parameters, to determine which reference signal resources to measure. Moreover, if the UE 104 receives revised assistance data from multiple UEs 105, the UE 104 may merge or combine the revised assistance data or select revised assistance data to use for positioning based on information received in the revised assistance data, such as the measured reference signal parameters or an indication of range to each of the UEs 105, e.g. Zone ID. For example, the UE 104 may give priority to revised assistance data that is received from the closest UE 105. Additionally, the UE 104 may merge or combine the revised assistance data or select revised assistance data to use for positioning based on a priority of the SL UEs. For example, if UE 105-1 is serving as a relay UE for UE 104, UE 105-1 may have a higher priority than UE 105-2, and accordingly, the UE 104 may prioritize revised assistance data from UE 105-1 over revised assistance data received from UE 105-2. If desired, any combination of considerations, e.g. measured parameters, ranges, and SL-UE priorities, may be used to combine or select revised assistance data for positioning.

The UE 104 may perform positioning using the revised assistance data and may send a report, e.g. to a location server, via a relay UE, such as UE 105-1.

Figure 4:
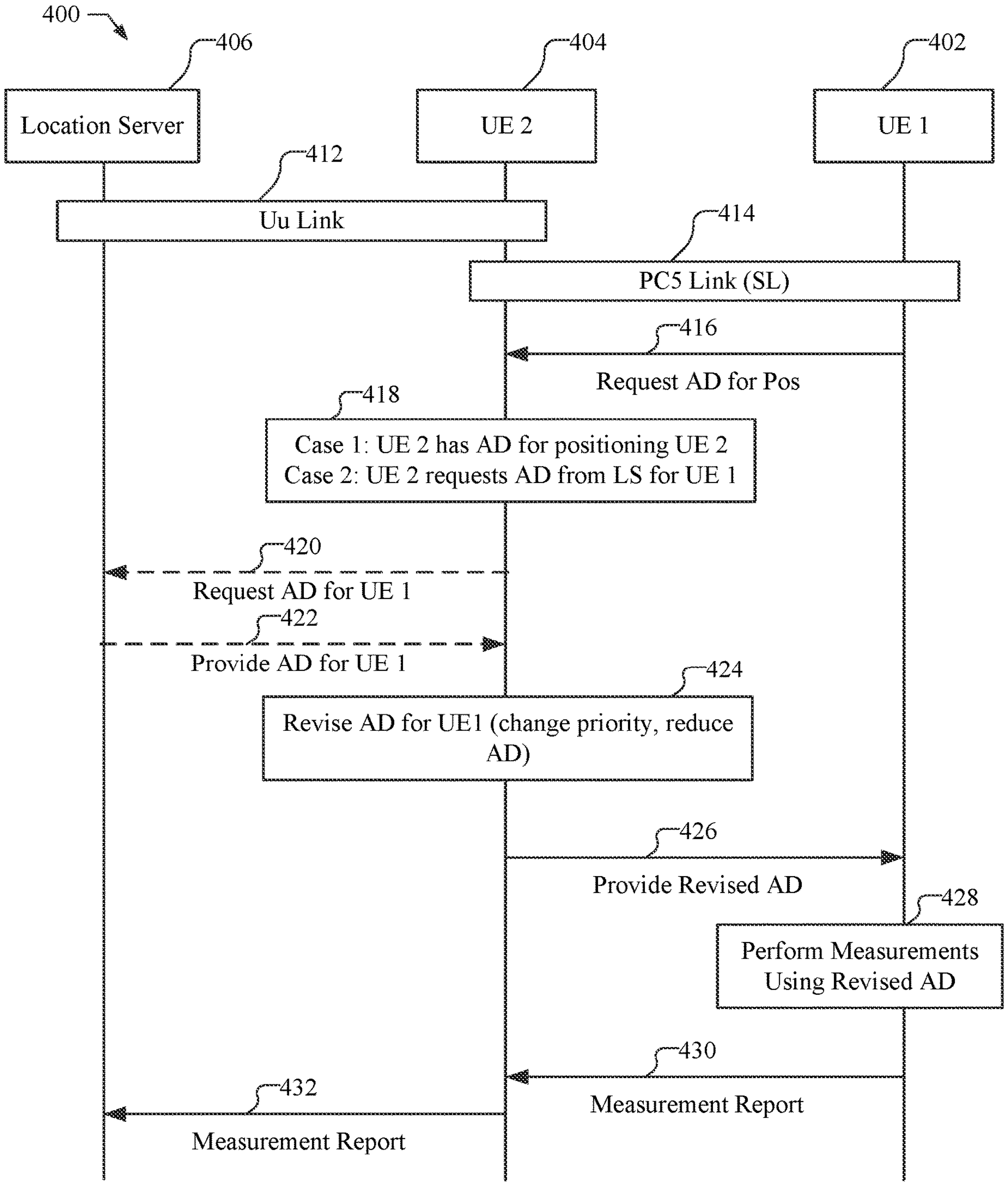
FIG. 4 is a call-flow diagram illustrating an embodiment of a positioning procedure for determining the position of a UE using revised assistance data generated by a sidelink UE connected to a location server.

FIG. 4 is a call-flow diagram illustrating an embodiment of a positioning procedure 400 for determining the position of a first UE 402 using revised assistance data generated by a second UE 404, as discussed herein. The first UE 402 may correspond to UE 104 shown in FIGS. 1, 2, and 3, and in some implementations may be a light UE. The second UE 404 may serve as a relay UE for UE 402, e.g., relaying communications between the first UE 402 and a location server 406 via a base station (now shown), which may be, e.g., an eNB or gNB as illustrated in FIGS. 1, 2, and 3. The location server 406 may correspond to location server 160 shown in FIG. 1, which in some implementations may be part of the NG-RAN 235 or may be LMF 220 shown in FIG. 2, or any other suitable location server such as an E-SMLC. As with the other figures provided herein, FIG. 4 is provided as a nonlimiting example. It can be noted that arrows between the various components illustrated in FIG. 4 illustrate messages or information sent from one component to another. It will be understood, however, that there may be any number of intervening devices, servers, etc. that may relay such messages, including other components in FIG. 4 (e.g., a message from the first UE 402 to the location server 406 may pass through the second UE 404, a base station (not shown), as well as other entities, such as AMF 215 (shown in FIG. 2). Additionally, although wireless reference signals are sometimes referred to as PRS (e.g., DL-PRS transmitted by a base station and SL-PRS transmitted by the second UE 404), alternative embodiments may utilize other wireless reference signal types.

At block 412, the second UE 404 has an established Uu link with a base station (not shown), which may be used to communicate with the location server 406.

At block 414, the first UE 402 and the second UE 404 have an established sidelink channel, such as a PC5 link. As part of establishing the sidelink channels the first UE 402 and the second UE 504 may determine their Zone IDs.

At stage 416, the first UE 402 sends a request for assistance data for positioning to the second UE 404 via the sidelink channel. The request for assistance data, for example, may be prompted by a position request which may be initiated by an application (or app) executed by the first UE 402, e.g., as a result from user interaction with the first UE 402, based on a determined schedule, or based on other triggers. Additionally or alternatively, a position request may come from a separate device (e.g., the second UE 404, the location server 406 (via the second UE 404) or another device in communication with the first UE 402) requesting the position of the first UE 402.

As illustrated at block 418, the second UE 404 obtains assistance data for positioning. There are multiple ways in which the second UE 404 may obtain the assistance data. In one case, the second UE 404 may already have assistance data for positioning, e.g., from a positioning session that it initiated for the purpose of estimation its own location. For example, the second UE 404 may have previously engaged in a positioning session with the location server 406 and obtained assistance data for positioning, e.g., related to DL-PRS and/or SL-PRS resources. Alternatively, the second UE 404 may generate the assistance data for positioning for the first UE 402, e.g., related to SL-PRS resources. In another case, the second UE 404 may obtain assistance data for positioning by contacting the location server 406 on behalf of the first UE 402, as illustrated in stages 420 and 422. The assistance data for DL-PRS, for example, may include at least one of DL-PRS resources, resource sets, frequency layers, or a combination thereof from one or more base stations, e.g., gNBs or TRPs, and the assistance data for sidelink SL-PRS may include at least one of SL-PRS resources, resource sets, frequency layers, or a combination thereof from one or more sidelink UEs. It should be understood that the assistance data is not limited to PRS, but any reference signal that may be used for positioning may be included in the assistance data for positioning.

At stage 420, which may be performed if the second UE 404 obtains assistance data from the location server 406 on behalf of the first UE 402, the second UE 404 may send a request for assistance data via the Uu link through a base station (not shown).

At stage 422, the location server 406 may send a provide assistance data message to the second UE 404 via the Uu link in response to the request of stage 420. As discussed in block 418, the assistance data may include assistance data for DL-PRS and/or SL-PRS.

At block 424, the second UE 404 revises the assistance data for positioning obtained at block 418 and optional stage 422. The second UE 404 may revise the assistance data by changing the priority of one or more assistance data components or reducing the assistance data components, or a combination thereof. For example, the second UE 404 may reprioritize one or more assistance data components, e.g., one or more PRS resources, one or more PRS resource sets, one or more positioning frequency layers, in the assistance data by assigning a new (different) prioritization ID or may reorder the assistance data components to adjust the prioritization of one or more assistance data components according to priority. The second UE 404 may reduce the assistance data components, e.g., one or more PRS resources, one or more PRS resource sets, one or more positioning frequency layers, by removing one or more assistance data components from the assistance data. The revision of the assistance data may be based on measurements performed by the second UE 404, such as signal strength measurements, e.g., RSRP, RSSI, RSRQ, SNR, etc. The revision of the assistance data may be based on knowledge of the capabilities of the first UE 402. For example, if the second UE 404 previously attempted to measure a PRS signal, but did not receive a good signal, the second UE 404 may de-prioritize or exclude that PRS signal from the revised assistance data. For example, one of the beams (e.g., PRS resources) received by the second UE 404 may have a significant multipath component or may be very noisy, and thus, may be de-prioritized or excluded accordingly. In another example, a collection of beams (e.g., PRS resource set) may be oriented towards a direction that is not relevant to the location of the UEs, and may be de-prioritized or excluded accordingly. In another example, an entire positioning frequency layer (e.g. mmW band) may have too much pathloss and, thus, cannot be received reliably, and accordingly, may be de-prioritized or excluded accordingly. The measurements, e.g., multipath component, noise, direction, pathloss, etc., may be compared to predetermined thresholds to determine whether to de-prioritize or exclude the assistance data component, or may be compared to measurements of other assistance data components and de-prioritized accordingly (e.g., weaker components are de-prioritized), and excluded if a number of superior assistance data components are available (e.g., the number of superior assistance data components may be based on the capabilities of the first UE 402). In another example, if the second UE 404 knows the capabilities of the first UE 402, for example, knows that first UE 402 is low power and cannot transmit UL-PRS signals to base stations, the second UE 404 may de-prioritize or exclude assistance data related to uplink signaling, such as RTT.

At stage 426, the second UE 404 sends the revised assistance data to the first UE 404 via the sidelink channel in an assistance data message. The second UE 404 may additionally include measured parameters, such as the measured signal strength parameters, related to the PRS in the revised assistance data. The second UE 404 may additionally include an indication of range between the second UE 404 and the first UE 402, such as the Zone ID for the second UE 404 determined by the second UE 404 for the sidelink channel in block 414. The first UE 402, for example, may use the Zone ID for the second UE 404, along with its own Zone ID to estimate a range or distance between the first UE 402 and second UE 404.

At block 428, the first UE 402 performs positioning measurements using the revised assistance data received at stage 426. The first UE 402, for example, may perform downlink positioning measurements for DL-PRS transmitted from one or more base stations and/or sidelink positioning measurements using SL-PRS transmitted from one or more sidelink UEs, such as second UE 404. The positioning measurements, for example, may be strength related measurements, e.g., RSRP, RSSI, RSRQ etc., timing related measurements, e.g., TOA, RSTD, etc., angle based measurements, e.g., AoD, AoA, or any combination thereof. The first UE 402 may use the measured parameters and/or indication of range if received with the revised assistance data to assist in the selection of reference signals in the revised assistance data for position measurements. For example, if the second UE 404 is near the first UE 402, but a measured signal strength parameter provided by the second UE 404 for a PRS is weaker than the first UE 402 is capable of accurately measuring, the first UE 402 may not measure that PRS.

At stage 430, the first UE 402 may send a measurement report that includes the positioning measurements to the second UE 404 via the sidelink channel.

At stage 432, the second UE 404 may send the measurement report from the first UE 402 to the location server 406 via a base station using the Uu link.

In some implementations, the UE may receive revised assistance data for positioning from multiple sidelink UEs. Each of the multiple sidelink UEs, however, may be in a different location and may receive PRS from different sources and with different signal strengths. For example, each of the UEs 105-1 and 105-2 shown in FIG. 3 may receive the same or different PRS during positioning sessions and the PRS measurements may have different signal strengths. Each of UE 105-1 and UE 105-2 may revise positioning assistance data for UE 104, but the two sets of revised assistance data may not be identical. The UE 104 may receive the revised assistance data from multiple sources and may combine or merge the revised assistance data for measurement measurements, including selecting or excluding at least portions of the revised assistance data.

To assist the UE 104 in combining the revised assistance data, the UEs 105 may provide additional information with the revised assistance data, such as a signal strength indicator, e.g., RSRP, RSSI, etc., associated with each measured PRS. For example, UE 105-1 may send UE 104 a first set of revised assistance data indicating an RSRP1 is associated with PRS1 and RSPR2 is associated with PRS2, with RSRP1 is greater than RSRP2, while UE 105-2 may send UE 104 a second set of revised assistance data indicating an RSRP3 is associated with PRS3 and RSPR4 is associated with PRS4, where RSRP4 is greater than RSRP2. The UE 104 may accordingly combine the sets of revised assistance data, e.g., to prioritize measurement in descending order of PRS1, PRS4, PRS2, and PRS3.

Additionally, the UEs 105 may provide an indication of their distance to UE 104 in the revised assistance data, which may be used by the UE 104 to combine or merge revised assistance data. For example, the UEs 105 may provide their Zone IDs, generated as part of sidelink transmission information that is included in SCI messages for SL-SCH transmission. The UE 104, for example, may prioritize revised assistance data from a UE with a Zone ID that is closest to its own Zone ID.

Additionally, the UE 104 may prioritize sidelink UEs and use the priority of the sidelink UEs to combine or merge revised assistance data. For example, a sidelink UE that serves as a relay UE for UE 104 may have a higher priority than other sidelink UEs. Similarly, a sidelink UE that is closely associated or paired with UE 104, such as maintaining a sidelink connection with UE 104, may be given a higher priority. By way of example, the UE 104 may be a smart watch that is closely associated with a UE 105-1 that is a smart phone. The UE 104 may prioritize revised assistance data from sidelink UEs with higher priority.

Figure 5:
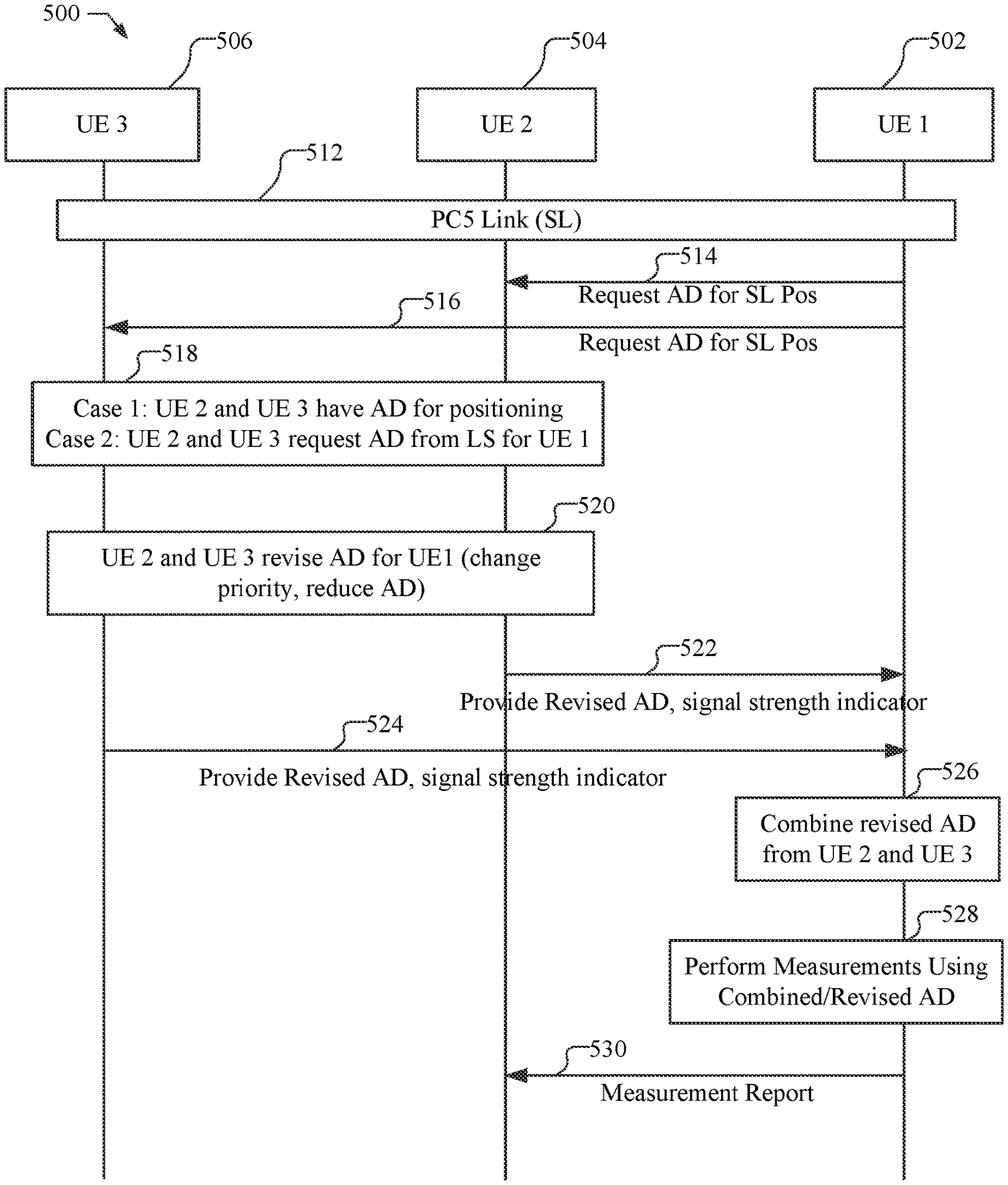
FIG. 5 is a call-flow diagram illustrating an embodiment of a positioning procedure for determining the position of a UE using revised assistance data generated by multiple sidelink UEs.

FIG. 5 is a call-flow diagram illustrating an embodiment of a positioning procedure 500 for determining the position of a first UE 502 using revised assistance data generated by multiple UEs, including a second UE 504 and a third UE 506, as discussed herein. The first UE 502 may correspond to UE 104 shown in FIGS. 1, 2, and 3, and in some implementations may be a light UE. The second UE 504 and third UE 506 may be connected to the first UE 502 via sidelink channels and in some implementations may be premium UEs. Additionally, in some implementations, the second UE 504 may serve as a relay UE for UE 502, e.g., relaying communications between the first UE 502 and a location server (not shown in FIG. 5) similar to the procedure 400 illustrated in FIG. 4. As with the other figures provided herein, FIG. 5 is provided as a nonlimiting example. It can be noted that arrows between the various components illustrated in FIG. 5 illustrate messages or information sent from one component to another. It will be understood, however, that there may be any number of intervening devices, servers, etc. that may relay such messages, including other components in FIG. 5 (e.g., messages between the second and third UEs 504 506 and a location server (not shown) may be transmitted via base stations and other core network entities, such as AMF 215 (shown in FIG. 2). Additionally, although wireless reference signals are sometimes referred to as PRS (e.g., DL-PRS transmitted by a base station and SL-PRS transmitted by the second UE 504 and third UE 506), alternative embodiments may utilize other wireless reference signal types.

At block 512, the first UE 502 has an established sidelink channel, such as a PC5 link with the second UE 504 and the third UE 506. In some implementations, the second UE 504 and third UE 506 may also have established sidelink channels between themselves. As part of establishing the sidelink channels the first UE 502, the second UE 504, and the third UE 506 may determine their Zone IDs.

Additionally, in some implementations, one or both of the second UE 504 and third UE 506 may have an established Uu link with a base station (not shown), which may be used to communicate with the location server, e.g., as discussed at block 412 shown in FIG. 4.

At stage 514, the first UE 502 sends a request for assistance data for positioning to the second UE 504 via the sidelink channel. The request for assistance data, for example, may be prompted by a position request which may be initiated by an application (or app) executed by the first UE 502, e.g., as a result from user interaction with the first UE 502, based on a determined schedule, or based on other triggers. Additionally or alternatively, a position request may come from a separate device (e.g., the second UE 504, the location server 506 (via the second UE 504) or another device in communication with the first UE 502) requesting the position of the first UE 502.

At stage 516, the first UE 502 sends a request for assistance data for positioning to the third UE 506 via the sidelink channel.

As illustrated at block 518, the second UE 504 and the third UE 506 obtain assistance data for positioning. There are multiple ways in which the second UE 504 and the third UE 506 may obtain assistance data for positioning. In one case, the second UE 504 and third UE 506 may already have assistance data for positioning, e.g., from recent positioning sessions. For example, each of the second UE 504 and third UE 506 may have previously engaged in a positioning session with a location server and obtained assistance data for positioning, e.g., related to DL-PRS and/or SL-PRS resources. Alternatively, the second UE 504 and the third UE 506 may generate the assistance data for positioning for the first UE 502, e.g., related to SL-PRS resources. For example, the second UE 504 and third UE 506 may independently generate assistance data or may communicate between themselves (and optionally other available sidelink UEs) to cooperatively generate the assistance data. In another case, one or both of the second UE 504 and the third UE 506 may obtain assistance data for positioning by contacting a location server on behalf of the first UE 502, e.g., as illustrated in stages 420 and 422 in FIG. 4. The assistance data for DL-PRS, for example, may include at least one of DL-PRS resources, resource sets, frequency layers, or a combination thereof from one or more base stations, e.g., gNBs or TRPs, and the assistance data for sidelink SL-PRS may include at least one of SL-PRS resources, resource sets, frequency layers, or a combination thereof from one or more sidelink UEs. It should be understood that the assistance data is not limited to PRS, but any reference signal that may be used for positioning may be included in the assistance data for positioning.

At block 520, similar to block 424 discussed in FIG. 4, each of the second UE 504 and third UE 506 may revise the assistance data for positioning obtained at block 518. The assistance data for positioning may be revised by changing the priority of one or more assistance data components or reducing the assistance data components, or a combination thereof. For example, the second UE 504 and/or the third UE 506 may reprioritize one or more assistance data components, e.g., one or more PRS resources, one or more PRS resource sets, one or more positioning frequency layers, in the assistance data by assigning a new (different) prioritization ID or may reorder the assistance data components to adjust the prioritization of one or more assistance data components according to priority. The second UE 504 and/or third UE 506 may additionally or alternatively reduce the assistance data components, e.g., one or more PRS resources, one or more PRS resource sets, one or more positioning frequency layers, by removing one or more assistance data components from the assistance data. The revision of the assistance data may be based on signal measurements, such as signal strength measurements, e.g., RSRP, RSSI, RSRQ, SNR, etc. The revision of the assistance data may additionally be based on knowledge of the capabilities of the first UE 502. For example, if the second UE 504 or third UE 506 previously attempted to measure a PRS signal, but did not receive a good signal, that PRS may be de-prioritized or excluded from the revised assistance data. For example, one of the beams (e.g., PRS resources) received by the second UE 504 or third UE 506 may have a significant multipath component or may be very noisy, and thus, may be de-prioritized or excluded accordingly. In another example, a collection of beams (e.g., PRS resource set) may be oriented towards a direction that is not relevant to the location of the UEs, and may be de-prioritized or excluded accordingly. In another example, an entire positioning frequency layer (e.g. mmW band) may have too much pathloss and, thus, cannot be received reliably, and accordingly, may be de-prioritized or excluded accordingly. The measurements, e.g., multipath component, noise, direction, pathloss, etc., may be compared to predetermined thresholds to determine whether to de-prioritize or exclude the assistance data component, or may be compared to measurements of other assistance data components and de-prioritized accordingly (e.g., weaker components are de-prioritized), and excluded if a number of superior assistance data components are available (e.g., the number of superior assistance data components may be based on the capabilities of the first UE 502). In another example, if the second UE 504 or third UE 506 knows the capabilities of the first UE 502, for example, knows that first UE 502 is low power and cannot transmit UL-PRS signals to base stations, positioning measurements that rely on uplink signaling, such as RTT may de-prioritized or excluded from the assistance data.

At stage 522, the second UE 504 sends the revised assistance data to the first UE 504 via the sidelink channel in an assistance data message. The second UE 504 may additionally include measured parameters, such as the measured signal strength parameters, related to the PRS in the revised assistance data. The second UE 504 may additionally include an indication of range between the second UE 504 and the first UE 502, such as the Zone ID for the second UE 504 determined by the second UE 504 for the sidelink channel in block 512. The first UE 502, for example, may use the Zone ID for the second UE 504, along with its own Zone ID to estimate a range or distance between the first UE 502 and second UE 504.

At stage 524, the third UE 506 sends the revised assistance data to the first UE 504 via the sidelink channel in an assistance data message. The third UE 506 may additionally include measured parameters, such as the measured signal strength parameters, related to the PRS in the revised assistance data. The third UE 506 may additionally include an indication of range between the third UE 506 and the first UE 502, such as the Zone ID for the third UE 506 determined by the third UE 506 for the sidelink channel in block 512. The first UE 502, for example, may use the Zone ID for the third UE 506, along with its own Zone ID to estimate a range or distance between the first UE 502 and the third UE 506.

At block 526, the first UE 502 may merge or combine the revised assistance data or select revised assistance data received from the second UE 504 and the third UE 506. The first UE 502, for example, may merge or combine the revised assistance data based on information received with the revised assistance data, such as the measured parameters. The first UE 502, for example, may prioritize revised assistance data associated with greater strength measurements. Additionally or alternatively, the first UE 502 may merge or combine the revised assistance data based approximate distances to the first UE 504 and the third UE 506. For example, the first UE 502 may use its own Zone ID along with the Zone IDs received from the second UE 504 and the third UE 506 in stages 522 and 524 to determine an approximate distance to each of the second UE 504 and the third UE 506. The first UE 502, for example, may prioritize revised assistance data received from the closer of the second UE 504 and the third UE 506. Additionally or alternatively, the first UE 502 may merge or combine the revised assistance data or select revised assistance data to use for positioning based on a priority of the second UE 504 and the third UE 506. For example, if the second UE 504 serves as a relay UE for the UE 502 or is otherwise closely associated with the first UE 502, e.g., the first UE 502 maintains a sidelink connection with the second UE 504 but not the third UE 506, the second UE 504 may have a higher priority than the third UE 506. The first UE 502 may prioritize revised assistance data received from the UE with higher a higher priority. If desired, any combination of considerations, e.g. measured parameters, ranges, and SL-UE priorities, may be used to combine or select revised assistance data for positioning.

At block 528, the first UE 502 performs positioning measurements using the revised assistance data received at stage 522 and 524 and combined or merged at block 526. The first UE 502, for example, may perform downlink positioning measurements for DL-PRS transmitted from one or more base stations and/or sidelink positioning measurements using SL-PRS transmitted from one or more sidelink UEs, such as second UE 504. The positioning measurements, for example, may be strength related measurements, e.g., RSRP, RSSI, RSRQ etc., timing related measurements, e.g., TOA, RSTD, etc., angle based measurements, e.g., AoD, AoA, or any combination thereof.

At stage 530, the first UE 502 may send a measurement report that includes the positioning measurements to the second UE 504 via the sidelink channel. In some implementations, the second UE 504 may send the measurement report from the first UE 502 to a location server (not shown) via a base station using the Uu link, e.g., as illustrated at stage 432 in FIG. 4. The measurement report, for example, may include the measurement results, along with the PRS ID, resource set ID, resource ID, as well as the UE ID of the sidelink UE (e.g., the second UE 504 or the third UE 506) from which the first UE 702 obtained the revised assistance data that provided the PRS resource information used for the positioning measurement. By providing the UE ID to identify the source of the PRS resource information, a location server is informed about which of the revised assistance data from each UE 504 and 506 was used for measurement and reporting.

Figure 6:
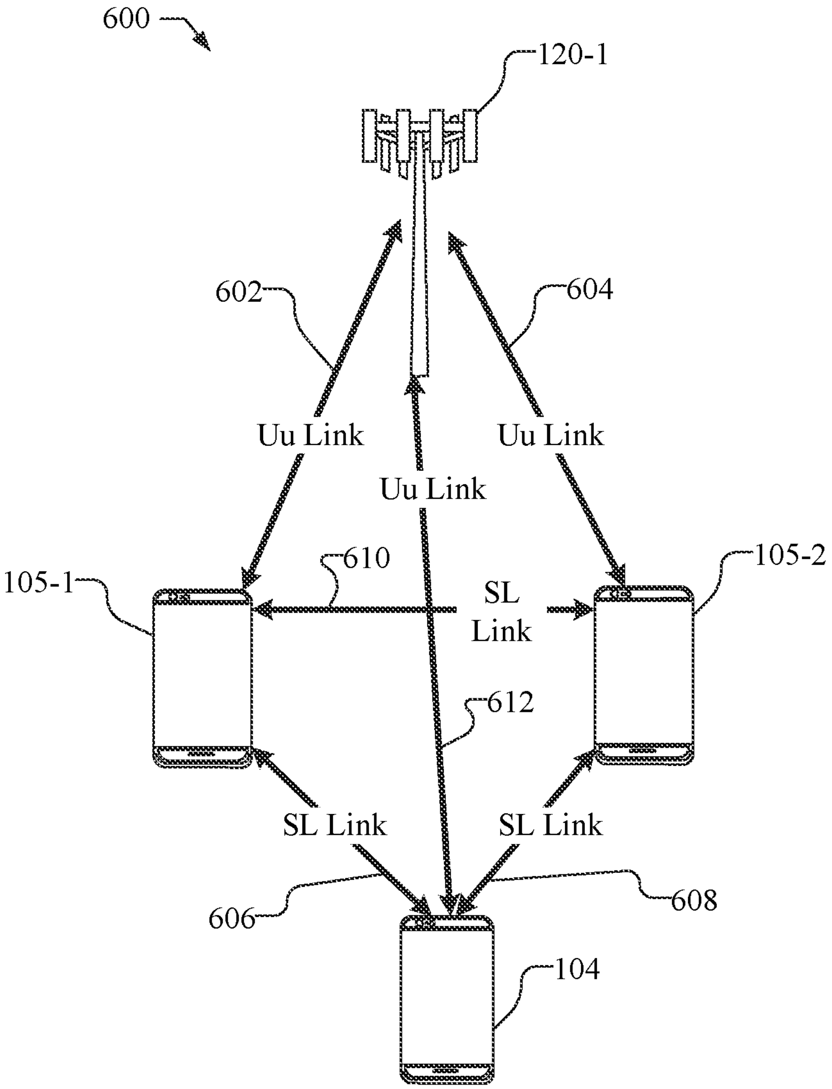
FIG. 6 is a diagram illustrating a simplified environment including a UE that is connected to multiple sidelink UEs via a sidelink channel, and the UE and the sidelink UEs are connected to a base station.

FIG. 6 is a diagram illustrating a simplified environment 600, similar to the environment 300 shown in FIG. 3, including a base station 120-1 (which may correspond to one of base station 120*s* of FIG. 1 and/or gNB s 210 and/or ng-eNB 214 of FIG. 2), multiple UEs 105-1 and 105-2, and a UE 104. As illustrated, the UEs 105-1, 105-2, and UE 104 are connected to the positioning system, e.g., illustrated by base station 120-1, via Uu links 602, 604, and 612, respectively. UE 104 is also connected to UEs 105-1 and 105-2 via sidelink links 606 and 608. The UEs 105-1 and 105-2 are illustrated as being in direct communication with each other via sidelink link 610. UEs 105-1 and 105-2 may sometimes be collectively referred to herein as UEs 105.

In the positioning environment 600, each of the UEs 104, 105-1, and 105-2 may perform a positioning session with a location server, e.g., LMF 220 shown in FIG. 2, via the Uu link with the base station 1201-1. A positioning session, for example, may include a number of steps or procedures to request and provide information, including a request for capabilities for capabilities message and provide capabilities message, a request for assistance data message and provide assistance data message, and a request to provide location information message and provide location information message. Each step or procedure to exchange information during a positioning session produces a latency in the system. The capabilities may be stored in the network and thus the exchange for capability information may be avoided in positioning session after an initial positioning session. The exchange for assistance data, however, may need to be performed in every positioning session and, thus, introduces latency. Moreover, as discussed above, the assistance data for positioning may include more resources than the UE 104 may be able to measure, e.g., either due to its capability or its environment. Accordingly, obtaining assistance data in every positioning session may not only increase latency, but may be a power drain.

In an implementation discussed herein, the UE 104 may obtain assistance data for positioning through one or both of the sidelink UEs 105-1 and 105-2, e.g., before entering a positing session with a location server. In some implementations, each UE 105-1 and 105-2 may revise the assistance data, such as reprioritizing or reordering the assistance data or reducing the assistance data, or a combination thereof, before sending the revised assistance data to the UE 104. The UE 104 may combine or merge the revised assistance data, if received from multiple sources. During the positioning session with the location server, the UE 104 may avoid the assistance data exchange with the location server because the UE 104 already has revised assistance data, and may perform positioning measurements using the revised assistance data. The UE 104 may report the location information, e.g., the measurement results, to the location server via the Uu link with base station 120-1. The measurement report may include a UE identifier indicating the UE that was the source of the revised assistance data used for the positioning measurements. For example, the measurement report may include the PRS ID, resource set ID, resource ID, and the UE ID for the sidelink UE that provided the revised assistance data. Accordingly, the UE 104 may receive the pertinent assistance data for positioning prior to a positioning session to reduce latency and increase power savings.

Figure 7:
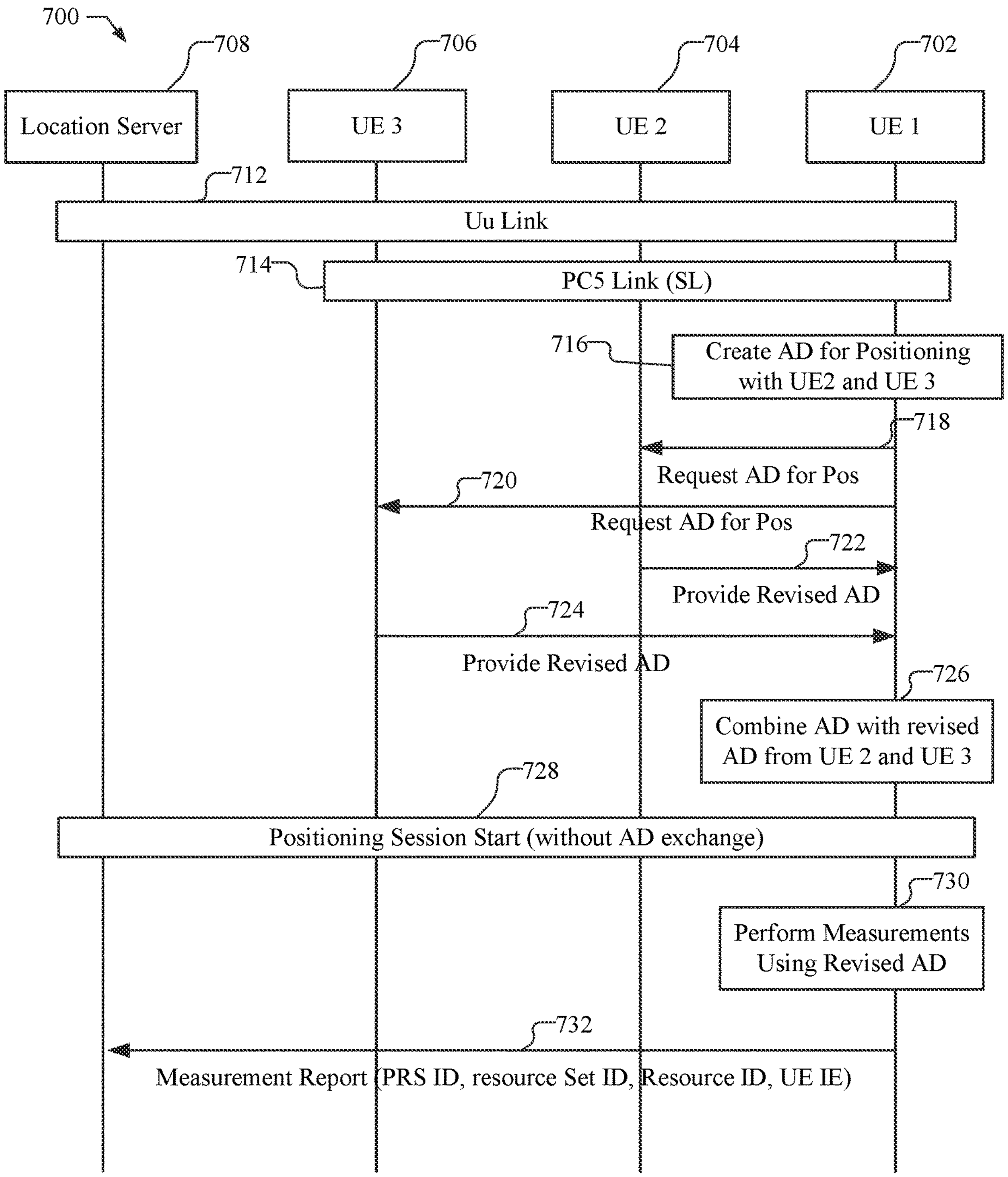
FIG. 7 is a call-flow diagram illustrating an embodiment of a positioning procedure for determining the position of a UE using revised assistance data generated by multiple sidelink UEs and the UE is connected to a location server.

FIG. 7 is a call-flow diagram illustrating an embodiment of a positioning procedure 700 for determining the position of a first UE 702 using revised assistance data generated by multiple UEs, including a second UE 704 and a third UE 706, prior to engaging in a positioning session with a location server 708, as discussed herein. The first UE 702 may correspond to UE 104 shown in FIGS. 1, 2, 3, and 6 and in some implementations may be a light UE. The second UE 704 and third UE 706 may be connected to the first UE 502 via sidelink channels and in some implementations may be premium UEs, and may correspond to UE 105 shown in FIGS. 1, 2, 3, and 6. The UEs 702, 704, and 706 may connect to the location server 708 via a base station (now shown), which may be, e.g., an eNB or gNB as illustrated in FIGS. 1, 2, 3, and 6. The location server 706 may correspond to location server 160 shown in FIG. 1, which in some implementations may be part of the NG-RAN 235 or may be LMF 220 shown in FIG. 2, or any other suitable location server such as an E-SMLC. As with the other figures provided herein, FIG. 7 is provided as a nonlimiting example. It can be noted that arrows between the various components illustrated in FIG. 7 illustrate messages or information sent from one component to another. It will be understood, however, that there may be any number of intervening devices, servers, etc. that may relay such messages, including other components in FIG. 7 (e.g., a message from the first UE 702 to the location server 706 may pass through a base station (not shown), as well as other entities, such as AMF 215 (shown in FIG. 2). Additionally, although wireless reference signals are sometimes referred to as PRS (e.g., DL-PRS transmitted by a base station and SL-PRS transmitted by the second UE 704 and third UE 706), alternative embodiments may utilize other wireless reference signal types.

At block 712, the first UE 702, second UE 704, and third UE 706 may have an established Uu link with a base station (not shown), which may be used to communicate with the location server 708.

At block 714, the first UE 702, the second UE 704, and the third UE 706 have an established sidelink channel, such as a PC5 link. As part of establishing the sidelink channels the first UE 702, the second UE 704, and the third UE 706 may determine their Zone IDs.

As illustrated at block 718, the first UE 702 obtains assistance data for positioning from the second UE 704 and the third UE 706, which is further illustrated in stages 718, 720, 722, and 724. The assistance data, for example, may be obtained in a manner similar to stage 416, block 418, and stages 420 and 422 in FIG. 4 and/or stages 514 and 516, blocks 518 and 520, and stages 522 and 524 in FIG. 5.

At stage 718, the first UE 702 sends a request for assistance data for positioning to the second UE 704 via the sidelink channel. The request for assistance data, for example, may be prompted by a position request which may be initiated by an application (or app) executed by the first UE 702, e.g., as a result from user interaction with the first UE 702, based on a determined schedule, or based on other triggers. Additionally or alternatively, a position request may come from a separate device (e.g., the second UE 704, the third UE 706, the location server 708 or another device in communication with the first UE 702) requesting the position of the first UE 702.

At stage 720, the first UE 702 sends a request for assistance data for positioning to the third UE 706 via the sidelink channel.

At stage 722, the second UE 704 sends revised assistance data to the first UE 702. The revised assistance data may be generated based on assistance data for positioning obtained by the second UE 704, such as discussed in block 418, and stages 420 and 422 in FIG. 4 and/or blocks 518 and 520 and stages 522 in FIG. 5. The second UE 704 may send additional information, such as signal strength measurements and/or indicators of the range to first UE 702 with the revised assistance data in stage 522.

At stage 724, the third UE 706 sends revised assistance data to the first UE 702. The revised assistance data may be generated based on assistance data for positioning obtained by the second UE 704, such as discussed in block 418, and stages 420 and 422 in FIG. 4 and/or blocks 518 and 520 and stages 524 in FIG. 5. The third UE 706 may send additional information, such as signal strength measurements and/or indicators of the range to first UE 702 with the revised assistance data in stage 524.

At block 726, the first UE 702 may merge or combine the revised assistance data or select revised assistance data received from the second UE 704 and the third UE 706, e.g., as discussed in block 526 of FIG. 5.

At block 728, a positioning session for the first UE 702 with the location server 708 may start. The start of the positioning session, for example, may include an exchange of capabilities messages, such as a request for capabilities message from the location server 708 and a provide capabilities message from the first UE 702. The positioning session, however, does not include an exchange of assistance data because the first UE 702 has already obtained at stage 726 assistance data that may be used for positioning, thereby decreasing latency and saving power during the positioning session. It should be understood that while the start of the positioning session at block 728 is illustrated as occurring after block 726, the positioning session may start at any time in the positioning procedure 700, e.g., before block 716. For example, a periodic or triggered positioning session may be initiated earlier than block 716, and the first UE 702 may obtain assistance data from sidelink UEs 704 and 706 at block 716 prior to the expiration of the periodic clock or prior to a trigger event for the positioning session so that exchange of assistance data with the location server 708 may not be necessary in the positioning session, thereby decreasing latency and saving power during the positioning session.

At block 730, the first UE 702 performs positioning measurements using the revised assistance data received from the second UE 704 and the third UE 706 and combined at stage 726. The first UE 702, for example, may perform downlink positioning measurements for DL-PRS transmitted from one or more base stations and/or sidelink positioning measurements using SL-PRS transmitted from one or more sidelink UEs, such as second UE 704. The positioning measurements, for example, may be strength related measurements, e.g., RSRP, RSSI, RSRQ etc., timing related measurements, e.g., TOA, RSTD, etc., angle based measurements, e.g., AoD, AoA, or any combination thereof.

At stage 732, the first UE 702 may send a measurement report to the location server 708 via a base station using the Uu link. The measurement report, for example, may include the measurement results, along with the PRS ID, resource set ID, resource ID, as well as the UE ID of the sidelink UE (e.g., the second UE 704 or the third UE 706) from which the first UE 702 obtained the revised assistance data that provided the PRS resource information used for the positioning measurement. By providing the UE ID to identify the source of the PRS resource information, the location server 708 is informed about which of the revised assistance data from each UE 704 and 706 was used for measurement and reporting.

Figure 8:
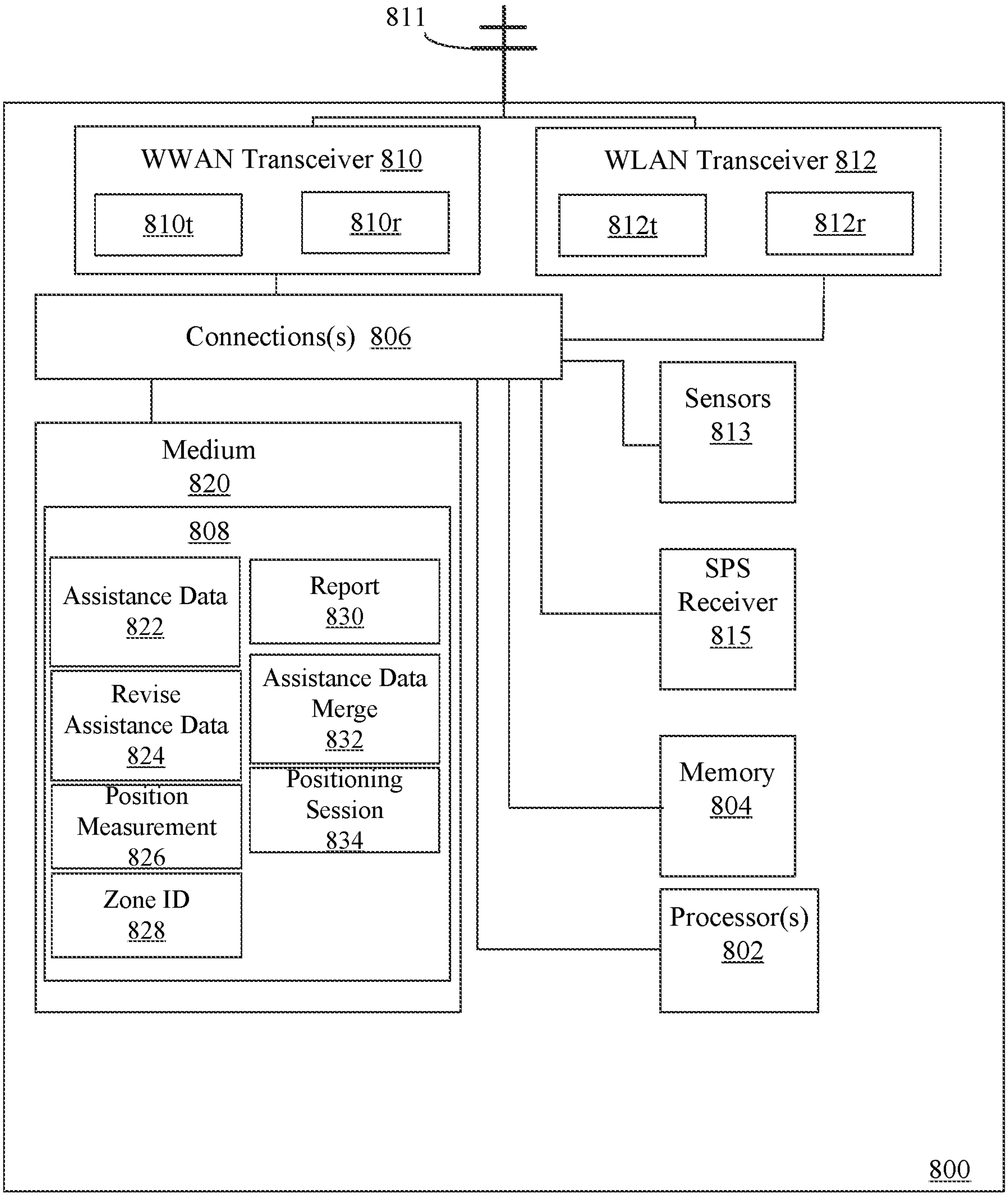
FIG. 8 shows a schematic block diagram illustrating certain exemplary features of a UE that is configured for supporting positioning using revised assistance data.

FIG. 8 shows a schematic block diagram illustrating certain exemplary features of a UE 800, e.g., which may be a target UE that receives revised assistance data, such as UE 104, 402, 502, and 702, or the source UE that generates and provides the revised assistance data, such as UE 105, 404, 504, and 704, or other UEs as described herein, that is configured for supporting positioning using revised assistance data, e.g., as discussed herein. The UE 800, for example, may perform the signal flows shown in FIGS. 4, 5, and 7 and the process flows shown in FIGS. 9, 10, and 11 and algorithms disclosed herein. The UE 800 may, for example, include one or more processors 802, memory 804, an external interface such as at least one wireless transceivers (e.g., wireless network interface) illustrated as WWAN transceiver 810 and WLAN transceiver 812, SPS receiver 815, and one or more sensors 813, which may be operatively coupled with one or more connections 806 (e.g., buses, lines, fibers, links, etc.) to non-transitory computer readable medium 820 and memory 804. The SPS receiver 815, for example, may receive and process SPS signals from SVs 190 shown in FIG. 1. The one or more sensors 813, for example, may be an inertial measurement unit (IMU) that may include one or more accelerometers, one or more gyroscopes, a magnetometer, etc. The UE 800 may further include additional items, which are not shown, such as a user interface that may include e.g., a display, a keypad or other input device, such as virtual keypad on the display, through which a user may interface with the UE. In certain example implementations, all or part of UE 800 may take the form of a chipset, and/or the like.

The UE 800 may include at least one wireless transceiver, such as transceiver 810 for a WWAN communication system and transceiver 812 for a WLAN communication system, or a combined a transceiver for both WWAN and WLAN. The WWAN transceiver 810 may include a transmitter 810*t* and receiver 810*r* coupled to one or more antennas 811 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 812 may include a transmitter 812*t* and receiver 812*r* coupled to one or more antennas 811 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 810*t* and 812*t* may include multiple transmitters that may be discrete components or combined/integrated components, and/or the receivers 810*r* and 812*r* may include multiple receivers that may be discrete components or combined/integrated components. The WWAN transceiver 810 may be configured to communicate signals (e.g., with base stations and/or one or more other devices) according to a variety of radio access technologies (RATs) such as 8G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 812 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 810 and 812 may be communicatively coupled to a transceiver interface, e.g., by optical and/or electrical connection, which may be at least partially integrated with the transceivers 810 and 812.

In some embodiments, UE 800 may include antenna 811, which may be internal or external. UE antenna 811 may be used to transmit and/or receive signals processed by wireless transceivers 810 and 812. In some embodiments, UE antenna 811 may be coupled to wireless transceivers 810 and 812. In some embodiments, measurements of signals received (transmitted) by UE 800 may be performed at the point of connection of the UE antenna 811 and wireless transceivers 810 and 812. For example, the measurement point of reference for received (transmitted) RF signal measurements may be an input (output) terminal of the receiver 810*r* (transmitter 810*t*) and an output (input) terminal of the UE antenna 811. In a UE 800 with multiple UE antennas 811 or antenna arrays, the antenna connector may be viewed as a virtual point representing the aggregate output (input) of multiple UE antennas. In some embodiments, UE 800 may measure received signals including signal strength and TOA measurements, and angle related measurements for DL PRS and/or SL PRS and the raw measurements may be processed by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in UE 800 is merely exemplary, and as such the functionality of the modules and/or data structures may be combined, separated, and/or be structured in different ways depending upon the implementation of the UE 800.

The medium 820 and/or memory 804 may include an assistance data module 822 that when implemented by the one or more processors 802 configures the one or more processors 802 to request assistance data and to receive assistance data (including one or more sets of revised assistance data) from one or more SL UEs or a location server, e.g., via one or more of wireless transceivers 810 and 812, and to receive a request for assistance data and to send assistance data (including revised assistance data) to a SL UE, e.g., via one or more of wireless transceivers 810 and 812. The one or more processors 802 may be further configured to generate assistance data for positioning, such as SL PRS assistance data, for a UE based on SL channels, as well as based on information provided by other SL UEs, e.g., via one or more of wireless transceivers 810 and 812. The assistance data for positioning, for example, may be at least one of DL PRS assistance data, SL PRS assistance data, (or other types of reference signals) or a combination thereof. The DL PRS assistance data, for example, may include at least one of PRS resources, resource sets, frequency layers, or a combination thereof from one or more base stations, and the SL PRS assistance data may include at least one of SL PRS resources, resource sets, frequency layers, or a combination thereof from one or more sidelink UEs. The assistance data for positioning may additionally include revised assistance data, e.g., assistance data that is reprioritized, reordered (e.g., based on priority), reduced, or a combination thereof, as discussed herein. The one or more processors 802 may be further configured to receive additional information with the revised assistance data, such as associated positioning measurements (e.g., signal strength measurements), and/or indications of range (e.g., Zone IDs).

The medium 820 and/or memory 804 may include a revise assistance data module 824 that when implemented by the one or more processors 802 configures the one or more processors 802 to revise assistance data for positioning for another UE, which may be a low tier UE. For example, the one or more processors 802 may be configured to at least one of reprioritize the assistance data, reorder the assistance data, or reduce the assistance data, or a combination thereof. The one or more processors 802, for example, may reprioritize the assistance data by assigning a new prioritization ID to reference signal resources in the assistance data, which is different than prioritization IDs that is included in assistance data. The one or more processors 802, for example, may reorder the assistance data by altering the order of the assistance data to adjust the prioritization of one or more resources in the assistance data according to priority. The one or more processors 802, for example, may reduce the assistance data, for example, by removing one or more resources from the assistance data. The one or more processors 802 may be configured to revise the assistance data, e.g., based on reference signal measurements.

The medium 820 and/or memory 804 may include a position measurement module 826 that when implemented by the one or more processors 802 configures the one or more processors 802 to perform reference signal measurements based on received assistance data or revised assistance data, e.g., via one or more of wireless transceivers 810 and 812. The position measurements may include measurements of DL PRS and/or SL PRS and may include measurements of signal strength parameters, RSRP, RSSI, RSRQ etc., timing related parameters, e.g., TOA, RSTD, etc., angle based parameters, e.g., AoD, AoA, or any combination thereof.

The medium 820 and/or memory 804 may include a Zone ID module 828 that when implemented by the one or more processors 802 configures the one or more processors 802 to determine a Zone ID for the UE, e.g., based on its geodesic distance in longitude and latitude to a geographic coordinate, and a configured zone length, e.g., as performed for sidelink transmission information included in SCI messages for a SL-SCH transmission.

The medium 820 and/or memory 804 may include a report module 830 that when implemented by the one or more processors 802 configures the one or more processors 802 to receive from another UE or send to another UE or a location server, e.g., via one or more of wireless transceivers 810 and 812, a report with location information, such as a measurement report including position measurements. The measurement report, for example, may include with the position measurement values, the PRS ID, resource set ID, resource ID, and the UE ID for the sidelink UE that provided the revised assistance data.

The medium 820 and/or memory 804 may include an assistance data merge module 832 that when implemented by the one or more processors 802 configures the one or more processors 802 to combine or merge multiple sets of revised assistance data received for different UE sources to generate a combined set of assistance data for positioning measurements. For example, the one or more processors 802 may be configured to use measurement parameters, such as signal strength measurements, received with each set of revised assistance data to combine the sets of revised assistance data, e.g., with PRS resources associated with higher signal strengths having higher priority for measurement than PRS resources with lower signal strengths. The one or more processors 802 may be additionally or alternatively be configured to use indications of range to the UE, such as a Zone IDs, received with each set of revised assistance data to combine the sets of revised assistance data. For example, the Zone IDs of the UEs, along with the Zone ID for the UE 800 may be used to determine an approximate distance between the UEs, and UE 800 may assign a higher priority to revised assistance data provided by a UE that is closer to the UE 800 when combining the revised assistance data. The one or more processors 802 may be additionally or alternatively be configured to use a priority of the UEs to combine the sets of revised assistance data. For example, the one or more processors 802 may assign a higher priority to a UE that serves as a relay UE or that is closely associated or paired with the UE 800 and may assign a higher priority to revised assistance data provided by a higher priority UE when combining the revised assistance data.

The medium 820 and/or memory 804 may include a positioning session module 834 that when implemented by the one or more processors 802 configures the one or more processors 802 to engage in a positioning session with a location server including sending and receiving one or more messages to or from a location server in the wireless network to initiate a positioning session. The one or more processors 802 may be configured to not request assistance data from the location server during the positioning session when revised assistance data has been received from one or more SL UEs.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support positioning of a UE using revised assistance data in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a wireless transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
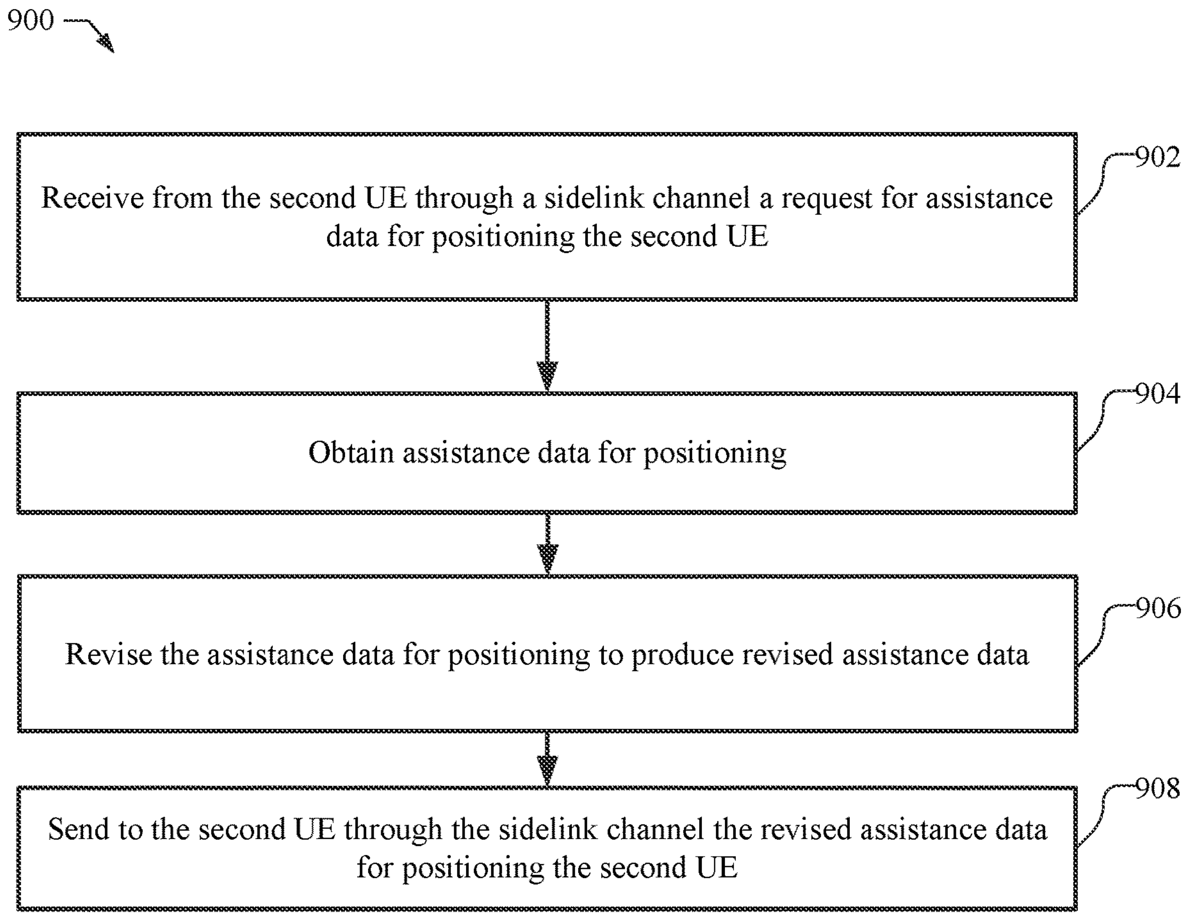
FIG. 9 shows a flow diagram for an exemplary method for determining a position of a first UE performed by second UE that provides revised assistance data to the first UE, in a manner consistent with disclosed implementations.

FIG. 9 shows a flow diagram for an exemplary method 900 performed by a first UE in wireless network to determine a position of a second UE, in a manner consistent with disclosed implementations. The first UE, for example, may be a UE such as UE 105, 404, 504, 704, or 800 and the second UE may be a UE, such as UE 104, 402, 502, or 702. The first UE, for example, may be a communication relay UE for the second UE.

At block 902, the first UE may receive from the second UE through a sidelink channel a request for assistance data for positioning the second UE, e.g., as discussed at stage 416 in FIG. 4, stage 514 in FIG. 5, and stage 718 of FIG. 7. A means for receiving from the second UE through a sidelink channel a request for assistance data for positioning the second UE may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 904, the first UE obtains assistance data for positioning, e.g., as discussed at stages 418, 420, and 422 in FIG. 4, stage 518 in FIG. 5, and stages 718 and 722 of FIG. 7. The assistance data for positioning, for example, may be at least one of downlink reference signal assistance data, sidelink reference signal assistance data, or a combination thereof. The downlink reference signal assistance data, for example, may include at least one of reference signal resources, resource sets, frequency layers, or a combination thereof from one or more base stations, and the sidelink reference signal assistance data may include at least one of reference signal resources, resource sets, frequency layers, or a combination thereof from one or more sidelink UEs. A means for obtaining assistance data for positioning may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 906, the first UE revises the assistance data for positioning to produce revised assistance data, e.g., as discussed at stage 424 in FIG. 4, stage 520 in FIG. 5, and stages 718 and 722 of FIG. 7. For example, in some implementation, the first UE may revise the assistance data by at least one of reprioritizing the assistance data, reordering the assistance data, reducing the assistance data, or a combination thereof, e.g., as discussed at stage 424 in FIG. 4, stage 520 in FIG. 5, and stages 718 and 722 of FIG. 7. Reprioritizing the assistance data, for example, may include assigning new prioritization identifiers (IDs) that are different than prioritization IDs included in the assistance data for positioning. Reordering the assistance data, for example, may alters the order of the assistance data to adjust the prioritization of one or more resources in the assistance data according to priority. Reducing the assistance data, for example, by removing one or more resources from the assistance data. A means for revising the assistance data for positioning to produce revised assistance data may include, e.g., the wireless transceiver 810 or wireless transceiver 812 and one or more processors 802 with dedicated hardware or implementing executable code or software instructions in memory 804 and/or medium 820 in UE 800, such as the revise assistance data module 824, shown in FIG. 8.

At block 908, the first UE sends to the second UE through the sidelink channel the revised assistance data for positioning the second UE, e.g., as discussed at stage 426 in FIG. 4, stage 522 in FIG. 5, and stage 722 of FIG. 7. A means for sending to the second UE through the sidelink channel the revised assistance data for positioning the second UE may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

In one implementation, the first UE may perform reference signal measurements, wherein revising the assistance data is based on the reference signal measurements, e.g., as discussed at stage 424 in FIG. 4, stage 520 in FIG. 5, and stages 718 and 722 of FIG. 7. For example, the first UE may perform reference signal measurements by measuring a signal strength parameter, wherein the signal strength parameter is sent to the second UE with the revised assistance data, e.g., as discussed at stages 424 and 426 in FIG. 4, stages 520 and 522 in FIG. 5, and stages 718 and 722 of FIG. 7. Reference signal resources in the assistance data, for example, with the weakest signals or that cannot be measured by the first UE are deprioritized or excluded in the revised assistance data. The reference signal measurements, for example, may be strength related measurements, e.g., RSRP, RSSI, RSRQ etc., timing related measurements, e.g., TOA, RSTD, etc., angle based measurements, e.g., AoD, AoA, or any combination thereof. A means for performing reference signal measurements, wherein revising the assistance data is based on the reference signal measurements, may include, e.g., the wireless transceiver 810 or wireless transceiver 812 and one or more processors 802 with dedicated hardware or implementing executable code or software instructions in memory 804 and/or medium 820 in UE 800, such as the position measurement module 826, shown in FIG. 8.

In some implementations, the first UE may obtain the assistance data for positioning the second UE by sending a request for assistance data to a location server, e.g., as discussed at stages 418, and 420 in FIG. 4, stage 518 in FIG. 5, and stages 718 and 722 of FIG. 7, and by receiving the assistance data from the location server, e.g., as discussed at stages 418, 422 in FIG. 4, stage 520 in FIG. 5, and stages 718 and 722 of FIG. 7. A means for sending a request for assistance data to a location server may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8. A means for receiving the assistance data from the location server may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

In some implementations, the first UE may obtain the assistance data for positioning the second UE by generating assistance data for sidelink positioning for the second UE, e.g., as discussed at stage 418 in FIG. 4, stage 518 in FIG. 5, and stages 718 and 722 of FIG. 7. A means for generating assistance data for sidelink positioning for the second UE may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

In some implementations, the first UE may obtain an indication of range to between the first UE and the second UE, wherein the indication of range is sent to the second UE with the revised assistance data, e.g., as discussed at stages 414 and 426 in FIG. 4, stages 512 and 522 in FIG. 5, and stages 714 and 722 of FIG. 7. The indication of range, for example, may be a zone identifier (ID) for the first UE. A means for obtaining an indication of range to between the first UE and the second UE, wherein the indication of range is sent to the second UE with the revised assistance data may include, e.g., the wireless transceiver 810 or wireless transceiver 812 and one or more processors 802 with dedicated hardware or implementing executable code or software instructions in memory 804 and/or medium 820 in UE 800, such as the Zone ID module 828, shown in FIG. 8.

In some implementations, the first UE may receive a measurement report from the second UE, e.g., as discussed at stage 430 in FIG. 4 and stage 530 in FIG. 5. The first UE may send the measurement report to a location server, e.g., as discussed at stage 432 in FIG. 4 and stage 530 in FIG. 5. A means for receiving a measurement report from the second UE may include, e.g., the wireless transceiver 810 or wireless transceiver 812 and one or more processors 802 with dedicated hardware or implementing executable code or software instructions in memory 804 and/or medium 820 in UE 800, such as the report module 830, shown in FIG. 8. A means for sending the measurement report to a location server may include, e.g., the wireless transceiver 810 or wireless transceiver 812 and one or more processors 802 with dedicated hardware or implementing executable code or software instructions in memory 804 and/or medium 820 in UE 800, such as the report module 830, shown in FIG. 8.

Figure 10:
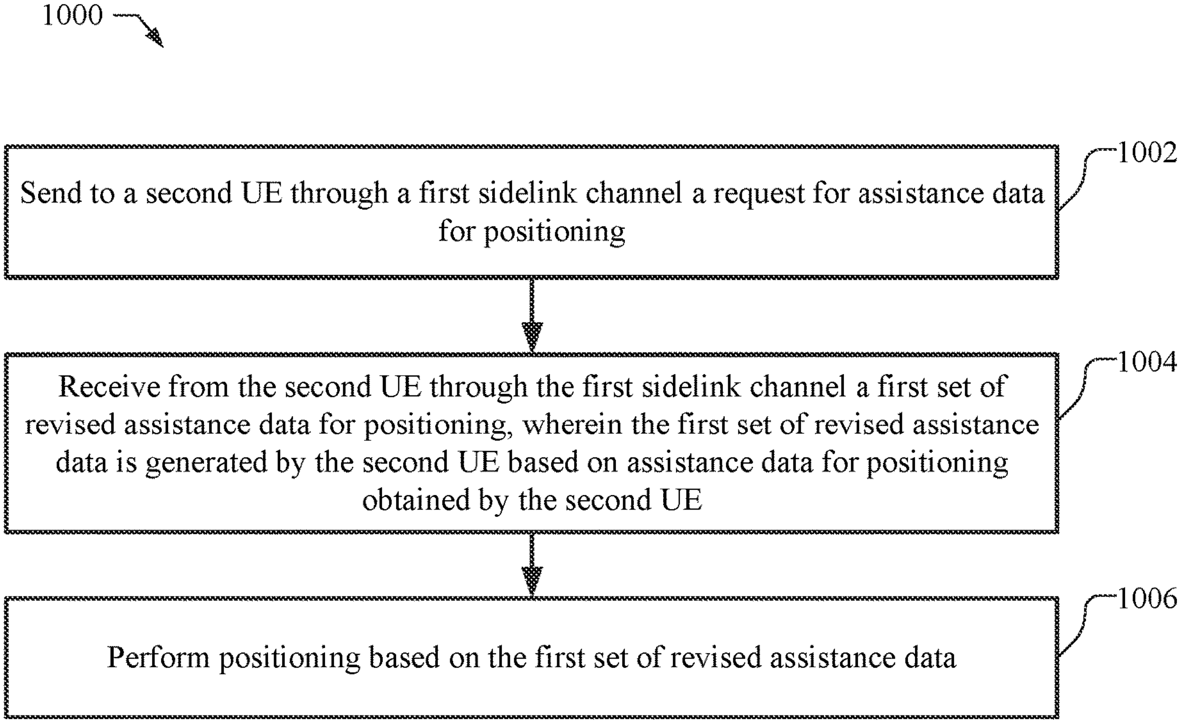
FIG. 10 shows a flow diagram for an exemplary method for determining a position of a first UE performed by the first UE that receives revised assistance data from a second UE, in a manner consistent with disclosed implementations.

FIG. 10 shows a flow diagram for an exemplary method 1000 performed by a first UE in wireless network to determine a position of the first UE, in a manner consistent with disclosed implementations. The first UE, for example, may be a UE such as UE 104, 402, 502, 702, or 800.

At block 1002, the first UE send to a second UE through a first sidelink channel a request for assistance data for positioning, e.g., as discussed at stage 416 in FIG. 4, stage 514 in FIG. 5, and stage 718 of FIG. 7. The second UE, for example, may be a UE such as UE 105, 404, 504, 704. The second UE, for example, may be a communication relay UE for the first UE. A means for sending to a second UE through a first sidelink channel a request for assistance data for positioning may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 1004, the first UE receives from the second UE through the first sidelink channel a first set of revised assistance data for positioning, wherein the first set of revised assistance data is generated by the second UE based on assistance data for positioning obtained by the second UE, e.g., as discussed at stage 426 in FIG. 4, stage 522 in FIG. 5, and stage 722 of FIG. 7. The first set of revised assistance data, for example, may include at least one of downlink reference signal assistance data, sidelink reference signal assistance data, or a combination thereof. The downlink reference signal assistance data, for example, may include at least one of reference signal resources, resource sets, frequency layers, or a combination thereof from one or more base stations, and the sidelink reference signal assistance data may include at least one of reference signal resources, resource sets, frequency layers, or a combination thereof from one or more sidelink UEs. In some implementations, the first set of revised the assistance data may be generated by the second UE based on reference signal measurements performed by the second UE, e.g., as discussed at stage 424 in FIG. 4, stage 520 in FIG. 5, and stages 718 and 722 of FIG. 7. A means for receiving from the second UE through the first sidelink channel a first set of revised assistance data for positioning, wherein the first set of revised assistance data is generated by the second UE based on assistance data for positioning obtained by the second UE may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 1006, the first UE performs positioning based on the first set of revised assistance data, e.g., as discussed at stage 428 in FIG. 4, stage 528 in FIG. 5, and stage 730 of FIG. 7. For example, performing positioning based on the first set of revised assistance data may include performing at least one of sidelink positioning using downlink positioning using downlink reference signals received from one or more base stations, sidelink reference signals received from one or more other UEs, or a combination thereof. The positioning may include positioning measurements that include for example, strength related measurements, e.g., RSRP, RSSI, RSRQ etc., timing related measurements, e.g., TOA, RSTD, etc., angle based measurements, e.g., AoD, AoA, or any combination thereof. A means for performing positioning based on the first set of revised assistance data may include, e.g., the wireless transceiver 810 or wireless transceiver 812 and one or more processors 802 with dedicated hardware or implementing executable code or software instructions in memory 804 and/or medium 820 in UE 800, such as the position measurement module 826, shown in FIG. 8.

In some implementations, the first set of revised the assistance data is generated by the second UE by at least one of reprioritizing the assistance data, reordering the assistance data, reducing the assistance data, or a combination thereof, e.g., as discussed at stage 424 in FIG. 4, stage 520 in FIG. 5, and stages 718 and 722 of FIG. 7. Reprioritizing the assistance data, for example, may include assigning new prioritization identifiers (IDs) that are different than prioritization IDs included in the assistance data for positioning. Reordering the assistance data, for example, may alters the order of the assistance data to adjust the prioritization of one or more resources in the assistance data according to priority. Reducing the assistance data, for example, by removing one or more resources from the assistance data.

In some implementations, the first UE may further send a measurement report to the second UE, e.g., as discussed at stage 430 in FIG. 4 and stage 530 in FIG. 5. A means for sending a measurement report to the second UE may include, e.g., the wireless transceiver 810 or wireless transceiver 812 and one or more processors 802 with dedicated hardware or implementing executable code or software instructions in memory 804 and/or medium 820 in UE 800, such as the report module 830, shown in FIG. 8.

Figure 11:
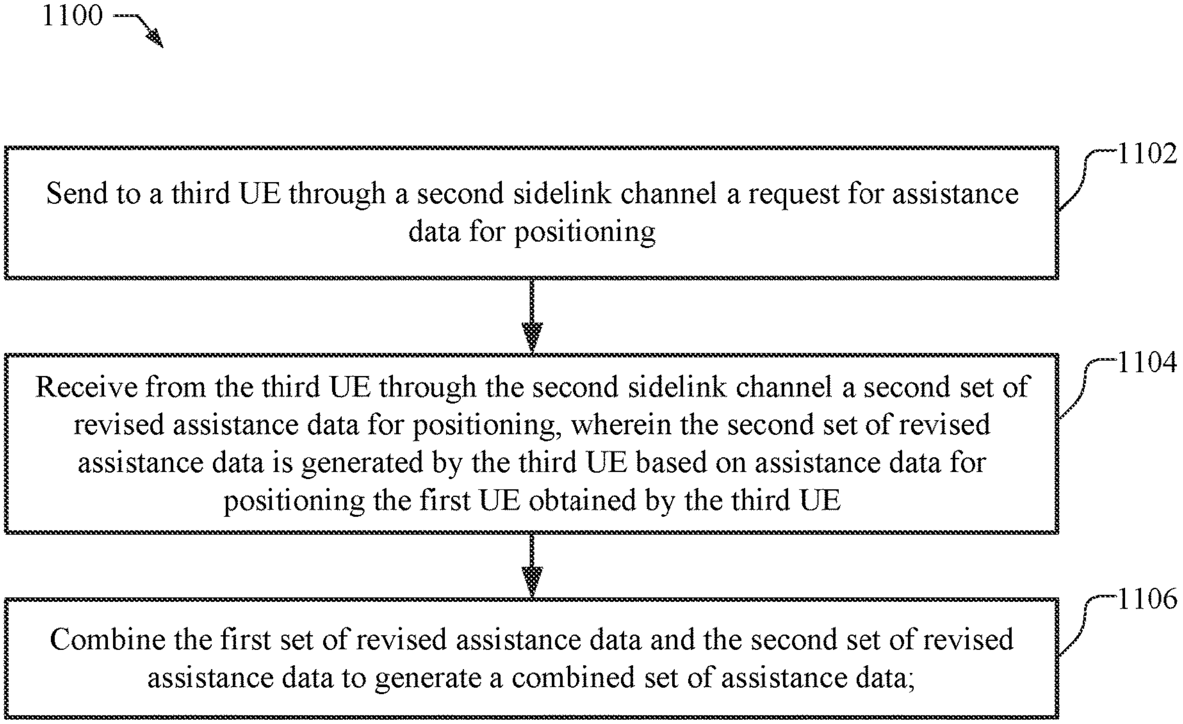
FIG. 11 shows a flow diagram for an exemplary method for determining a position of a first UE performed by the first UE that receives revised assistance data from a multiple UEs, in a manner consistent with disclosed implementations.

FIG. 11, which shows a flow diagram for an additional exemplary method 1100 that may be performed by the first UE in addition to method 1000 shown in FIG. 10 to determine the position of the first UE, in a manner consistent with disclosed implementations, includes a block 1102 in which the first UE sends to a third UE through a second sidelink channel a request for assistance data for positioning, e.g., as discussed at stage 516 in FIG. 5, and stage 720 of FIG. 7. A means for sending to a third UE through a second sidelink channel a request for assistance data for positioning may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 1104, the first UE may receive from the third UE through the second sidelink channel a second set of revised assistance data for positioning, wherein the second set of revised assistance data is generated by the third UE based on assistance data for positioning the first UE obtained by the third UE, e.g., as discussed at stage 524 in FIG. 5, and stage 724 of FIG. 7. A means for receiving from the third UE through the second sidelink channel a second set of revised assistance data for positioning, wherein the second set of revised assistance data is generated by the third UE based on assistance data for positioning the first UE obtained by the third UE may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

At block 1106, the first UE combines the first set of revised assistance data and the second set of revised assistance data to generate a combined set of assistance data, e.g., as discussed at stage 526 in FIG. 5, and stage 726 of FIG. 7. A means for combining the first set of revised assistance data and the second set of revised assistance data to generate a combined set of assistance data may include, e.g., the one or more processors 802 with dedicated hardware or implementing executable code or software instructions in memory 804 and/or medium 820 in UE 800, such as the assistance data merge module 832, shown in FIG. 8. The first UE may perform positioning based on the first set of revised assistance data using the combined set of assistance data.

In some implementations, the first UE may receive a first set of signal strength measurements from the second UE with the first set of revised assistance data and receiving a second set of signal strength measurements from the third UE with the second set of revised assistance data, wherein combining the first set of revised assistance data and the second set of revised assistance data to generate the combined set of assistance data uses the first set of signal strength measurements and the second set of signal strength measurements, e.g., as discussed at stages 522, 524, and 526 in FIG. 5, and stages 722, 724 and 726 of FIG. 7. A means for receiving a first set of signal strength measurements from the second UE with the first set of revised assistance data and receiving a second set of signal strength measurements from the third UE with the second set of revised assistance data, wherein combining the first set of revised assistance data and the second set of revised assistance data to generate the combined set of assistance data uses the first set of signal strength measurements and the second set of signal strength measurements may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

In some implementations, the first UE may receive a first indication of range between the second UE and the first UE with the first set of revised assistance data and receiving a second indication of range between the third UE and the first UE with the second set of revised assistance data, wherein combining the first set of revised assistance data and the second set of revised assistance data to generate the combined set of assistance data uses the first indication of range and the second indication of range, e.g., as discussed at stages 522, 524, and 526 in FIG. 5, and stages 722, 724 and 726 of FIG. 7. For example, the first indication of range may be a first zone identifier (ID) for the second UE and the second indication of range may be a second zone ID for the third UE. A means for receiving a first indication of range between the second UE and the first UE with the first set of revised assistance data and receiving a second indication of range between the third UE and the first UE with the second set of revised assistance data, wherein combining the first set of revised assistance data and the second set of revised assistance data to generate the combined set of assistance data uses the first indication of range and the second indication of range may include, e.g., the wireless transceiver 810 or wireless transceiver 812 and one or more processors 802 with dedicated hardware or implementing executable code or software instructions in memory 804 and/or medium 820 in UE 800, such as the assistance data module 822, shown in FIG. 8.

In some implementations, the first UE may combine the first set of revised assistance data and the second set of revised assistance data to generate the combined set of assistance data using relative priorities of the second UE and the third UE, e.g., as discussed at stage 526 in FIG. 5, and stage 726 of FIG. 7. For example, the first UE may assign a higher priority to a UE that serves as a relay UE or that is closely associated or paired with the first UE and may merge or combine the revised assistance data based on the priorities assigned to the UEs.

In some implementations, the first UE may further send or receive one or more messages to or from a location server in a wireless network to initiate a positioning session, wherein no assistance data is requested from the location server during the positioning session, e.g., as discussed at stage 728 of FIG. 7. The positioning session may be initiated after the combined set of assistance data is generated. A means for sending or receiving one or more messages to or from a location server in a wireless network to initiate a positioning session, wherein no assistance data is requested from the location server during the positioning session, may include, e.g., the wireless transceiver 810 or wireless transceiver 812 and one or more processors 802 with dedicated hardware or implementing executable code or software instructions in memory 804 and/or medium 820 in UE 800, such as the positioning session module 834, shown in FIG. 8. The first UE may perform positioning measurements for reference signals from one or more base stations in the wireless network.

In some implementations, the first UE may send a measurement report to the location server, wherein the measurement report includes a UE identifier for the second UE and the third UE, e.g., as discussed at stage 732 of FIG. 7. A means for sending a measurement report to the location server, wherein the measurement report includes a UE identifier for the second UE and the third UE may include, e.g., the wireless transceiver 810 or wireless transceiver 812 and one or more processors 802 with dedicated hardware or implementing executable code or software instructions in memory 804 and/or medium 820 in UE 800, such as the report module 830, shown in FIG. 8.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term “machine-readable medium” and “computer-readable medium” as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed by a first user equipment (UE) for determining a position of a second UE, the method comprising: receiving from the second UE through a sidelink channel a request for assistance data for positioning the second UE; obtaining assistance data for positioning; revising the assistance data for positioning to produce revised assistance data; and sending to the second UE through the sidelink channel the revised assistance data for positioning the second UE.

Clause 2. The method of clause 1, wherein revising the assistance data comprises at least one of reprioritizing the assistance data, reordering the assistance data, reducing the assistance data, or a combination thereof.

Clause 3. The method of clause 2, wherein reprioritizing the assistance data comprises assigning new prioritization identifiers (IDs) that are different than prioritization IDs included in the assistance data for positioning.

Clause 4. The method of any of clauses 1-3, wherein the first UE is a communication relay UE for the second UE.

Clause 5. The method of any of clauses 1-4, wherein the assistance data for positioning comprises at least one of downlink reference signal assistance data, sidelink reference signal assistance data, or a combination thereof.

Clause 6. The method of clause 5, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 7. The method of any of clauses 1-6, further comprising performing reference signal measurements, wherein revising the assistance data is based on the reference signal measurements.

Clause 8. The method of clause 7, wherein performing reference signal measurements comprises measuring a signal strength parameter, wherein the signal strength parameter is sent to the second UE with the revised assistance data.

Clause 9. The method of clause 7, wherein reference signal resources in the assistance data with the weakest signals or that cannot be measured are deprioritized or excluded in the revised assistance data.

Clause 10. The method of any of clauses 1-9, wherein obtaining the assistance data for positioning the second UE comprises: sending a request for assistance data to a location server; and receiving the assistance data from the location server.

Clause 11. The method of any of clauses 1-9, wherein obtaining the assistance data for positioning the second UE comprises generating assistance data for sidelink positioning for the second UE.

Clause 12. The method of any of clauses 1-11, further comprising obtaining an indication of range to between the first UE and the second UE, wherein the indication of range is sent to the second UE with the revised assistance data.

Clause 13. The method of clause 12, wherein the indication of range is a zone identifier (ID) for the first UE.

Clause 14. The method of any of clauses 1-13, further comprising: receiving a measurement report from the second UE; and sending the measurement report to a location server.

Clause 15. A first user equipment (UE) configured for determining a position of a second UE, the first UE comprising: at least one wireless transceiver configured to wirelessly communicate with other entities in a wireless network; at least one memory; and at least one processor coupled to the at least one wireless transceiver and the at least one memory and configured to: receive from the second UE through a sidelink channel a request for assistance data for positioning the second UE; obtain assistance data for positioning; revise the assistance data for positioning to produce revised assistance data; and send to the second UE through the sidelink channel the revised assistance data for positioning the second UE.

Clause 16. The first UE of clause 15, wherein the at least one processor is configured to revise the assistance data by being configured to at least one of reprioritize the assistance data, reorder the assistance data, reduce the assistance data, or a combination thereof.

Clause 17. The first UE of clause 16, wherein the at least one processor is configured to reprioritize the assistance data by being configured to assign new prioritization identifiers (IDs) that are different than prioritization IDs included in the assistance data for positioning.

Clause 18. The first UE of any of clauses 15-17, wherein the first UE is a communication relay UE for the second UE.

Clause 19. The first UE of any of clauses 15-18, wherein the assistance data for positioning comprises at least one of downlink reference signal assistance data, sidelink reference signal assistance data, or a combination thereof.

Clause 20. The first UE of clause 19, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 21. The first UE of any of clauses 15-20, wherein the at least one processor is further configured to perform reference signal measurements, wherein the at least one processor is configured to revise the assistance data based on the reference signal measurements.

Clause 22. The first UE of clause 21, wherein the at least one processor is configured to perform reference signal measurements by being configured to measure a signal strength parameter, wherein the signal strength parameter is sent to the second UE with the revised assistance data.

Clause 23. The first UE of clause 21, wherein reference signal resources in the assistance data with the weakest signals or that cannot be measured are deprioritized or excluded in the revised assistance data.

Clause 24. The first UE of any of clauses 15-23, wherein the at least one processor is configured to obtain the assistance data for positioning the second UE by being configured to: send a request for assistance data to a location server; and receive the assistance data from the location server.

Clause 25. The first UE of any of clauses 15-23, wherein the at least one processor is configured to obtain the assistance data for positioning the second UE by being configured to generate assistance data for sidelink positioning for the second UE.

Clause 26. The first UE of any of clauses 15-25, wherein the at least one processor is further configured to obtain an indication of range to between the first UE and the second UE, wherein the indication of range is sent to the second UE with the revised assistance data.

Clause 27. The first UE of clause 26, wherein the indication of range is a zone identifier (ID) for the first UE.

Clause 28. The first UE of any of clauses 15-27, wherein the at least one processor is further configured to: receive a measurement report from the second UE; and send the measurement report to a location server.

Clause 29. A first user equipment (UE) configured for determining a position of a second UE, the first UE comprising: means for receiving from the second UE through a sidelink channel a request for assistance data for positioning the second UE; means for obtaining assistance data for positioning; means for revising the assistance data for positioning to produce revised assistance data; and means for sending to the second UE through the sidelink channel the revised assistance data for positioning the second UE.

Clause 30. The first UE of clause 29, wherein the means for revising the assistance data at least one of reprioritizes the assistance data, reorders the assistance data, reduces the assistance data, or a combination thereof.

Clause 31. The first UE of clause 30, wherein reprioritizing the assistance data assigns new prioritization identifiers (IDs) that are different than prioritization IDs included in the assistance data for positioning.

Clause 32. The first UE of any of clauses 29-31, wherein the first UE is a communication relay UE for the second UE.

Clause 33. The first UE of any of clauses 29-32, wherein the assistance data for positioning comprises at least one of downlink reference signal assistance data, sidelink reference signal assistance data, or a combination thereof.

Clause 34. The first UE of clause 33, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 35. The first UE of any of clauses 29-34, further comprising means for performing reference signal measurements, wherein the means for revising the assistance data uses the reference signal measurements.

Clause 36. The first UE of clause 35, wherein the means for performing reference signal measurements measures a signal strength parameter, wherein the signal strength parameter is sent to the second UE with the revised assistance data.

Clause 37. The first UE of clause 35, wherein reference signal resources in the assistance data with the weakest signals or that cannot be measured are deprioritized or excluded in the revised assistance data.

Clause 38. The first UE of any of clauses 29-37, wherein the means for obtaining the assistance data for positioning the second UE comprises: means for sending a request for assistance data to a location server; and means for receiving the assistance data from the location server.

Clause 39. The first UE of any of clauses 29-37, wherein the means for obtaining the assistance data for positioning the second UE comprises means for generating assistance data for sidelink positioning for the second UE.

Clause 40. The first UE of any of clauses 29-39, further comprising means for obtaining an indication of range to between the first UE and the second UE, wherein the indication of range is sent to the second UE with the revised assistance data.

Clause 41. The first UE of clause 40, wherein the indication of range is a zone identifier (ID) for the first UE.

Clause 42. The first UE of any of clauses 29-41, further comprising: means for receiving a measurement report from the second UE; and means for sending the measurement report to a location server.

Clause 43. A non-transitory storage medium including program code stored thereon, the program code is operable to configure at least one processor in first user equipment (UE) for determining a position of a second UE, the program code comprising instructions to: receive from the second UE through a sidelink channel a request for assistance data for positioning the second UE; obtain assistance data for positioning; revise the assistance data for positioning to produce revised assistance data; and send to the second UE through the sidelink channel the revised assistance data for positioning the second UE.

Clause 44. The non-transitory storage medium of clause 43, wherein the instruction to revise the assistance data comprises instructions to at least one of reprioritize the assistance data, reorder the assistance data, reduce the assistance data, or a combination thereof.

Clause 45. The non-transitory storage medium of clause 44, wherein instructions to reprioritize the assistance data comprises instructions to assign new prioritization identifiers (IDs) that are different than prioritization IDs included in the assistance data for positioning.

Clause 46. The non-transitory storage medium of any of clauses 43-45, wherein the first UE is a communication relay UE for the second UE.

Clause 47. The non-transitory storage medium of any of clauses 43-46, wherein the assistance data for positioning comprises at least one of downlink reference signal assistance data, sidelink reference signal assistance data, or a combination thereof.

Clause 48. The non-transitory storage medium of clause 47, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 49. The non-transitory storage medium of any of clauses 43-48, further comprising instruction s to perform reference signal measurements, wherein the instructions to revise the assistance data uses the reference signal measurements.

Clause 50. The non-transitory storage medium of clause 49, wherein the instructions to perform reference signal measurements comprises instructions to measure a signal strength parameter, wherein the signal strength parameter is sent to the second UE with the revised assistance data.

Clause 51. The non-transitory storage medium of clause 49, wherein reference signal resources in the assistance data with the weakest signals or that cannot be measured are deprioritized or excluded in the revised assistance data.

Clause 52. The non-transitory storage medium of any of clauses 43-51, wherein the instructions to obtain the assistance data for positioning the second UE comprise instructions to: send a request for assistance data to a location server; and receive the assistance data from the location server.

Clause 53. The non-transitory storage medium of any of clauses 43-51, wherein the instructions to obtain the assistance data for positioning the second UE comprises instructions to generate assistance data for sidelink positioning for the second UE.

Clause 54. The non-transitory storage medium of any of clauses 43-53, further comprising instructions to obtain an indication of range to between the first UE and the second UE, wherein the indication of range is sent to the second UE with the revised assistance data.

Clause 55. The non-transitory storage medium of clause 54, wherein the indication of range is a zone identifier (ID) for the first UE.

Clause 56. The non-transitory storage medium of any of clauses 43-55, further comprising instructions to: receive a measurement report from the second UE; and send the measurement report to a location server.

Clause 57. A method performed by a first user equipment (UE) for determining a position of the first UE, the method comprising: sending to a second UE through a first sidelink channel a request for assistance data for positioning; receiving from the second UE through the first sidelink channel a first set of revised assistance data for positioning, wherein the first set of revised assistance data is generated by the second UE based on assistance data for positioning obtained by the second UE; and performing positioning based on the first set of revised assistance data.

Clause 58. The method of clause 57, wherein the first set of revised the assistance data is generated by the second UE by at least one of reprioritizing the assistance data, reordering the assistance data, reducing the assistance data, or a combination thereof.

Clause 59. The method of clause 58, wherein the second UE reprioritizes the assistance data by assigning new prioritization identifiers (IDs) that are different than prioritization IDs included in the assistance data for positioning.

Clause 60. The method of any of clauses 57-59, wherein the second UE is a communication relay UE for the first UE.

Clause 61. The method of any of clauses 57-60, wherein the first set of revised assistance data comprises at least one of downlink reference signal assistance data, sidelink reference signal assistance data, or a combination thereof.

Clause 62. The method of clause 61, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 63. The method of any of clauses 57-62, wherein the first set of revised the assistance data is generated by the second UE based on reference signal measurements performed by the second UE.

Clause 64. The method of any of clauses 57-63, further comprising sending a measurement report to the second UE.

Clause 65. The method of any of clauses 57-64, wherein performing positioning based on the first set of revised assistance data comprises performing at least one of sidelink positioning using downlink positioning using downlink reference signals received from one or more base stations, sidelink reference signals received from one or more other UEs, or a combination thereof.

Clause 66. The method of any of clauses 57-65, further comprising: sending to a third UE through a second sidelink channel a request for assistance data for positioning; receiving from the third UE through the second sidelink channel a second set of revised assistance data for positioning, wherein the second set of revised assistance data is generated by the third UE based on assistance data for positioning the first UE obtained by the third UE; combining the first set of revised assistance data and the second set of revised assistance data to generate a combined set of assistance data; wherein performing positioning based on the first set of revised assistance data comprises performing positioning using the combined set of assistance data.

Clause 67. The method of clause 66, further comprising receiving a first set of signal strength measurements from the second UE with the first set of revised assistance data and receiving a second set of signal strength measurements from the third UE with the second set of revised assistance data, wherein combining the first set of revised assistance data and the second set of revised assistance data to generate the combined set of assistance data uses the first set of signal strength measurements and the second set of signal strength measurements.

Clause 68. The method of any of clauses 66-67, further comprising receiving a first indication of range between the second UE and the first UE with the first set of revised assistance data and receiving a second indication of range between the third UE and the first UE with the second set of revised assistance data, wherein combining the first set of revised assistance data and the second set of revised assistance data to generate the combined set of assistance data uses the first indication of range and the second indication of range.

Clause 69. The method of clause 68, wherein the first indication of range is a first zone identifier (ID) for the second UE and the second indication of range is a second zone ID for the third UE.

Clause 70. The method of any of clauses 66-69, wherein combining the first set of revised assistance data and the second set of revised assistance data to generate the combined set of assistance data uses relative priorities of the second UE and the third UE.

Clause 71. The method of any of clauses 66-70, further comprising: sending or receiving one or more messages to or from a location server in a wireless network to initiate a positioning session, wherein no assistance data is requested from the location server during the positioning session; wherein performing positioning uses reference signals from one or more base stations in the wireless network.

Clause 72. The method of clause 71, wherein the positioning session is initiated after the combined set of assistance data is generated.

Clause 73. The method of clause 71, further comprising sending a measurement report to the location server, wherein the measurement report includes a UE identifier for the second UE and the third UE.

Clause 74. A first user equipment (UE) configured for determining a position of the first UE, the first UE comprising: at least one wireless transceiver configured to wirelessly communicate with entities in a wireless network; at least one memory; and at least one processor coupled to the at least one wireless transceiver and the at least one memory and configured to: send to a second UE through a first sidelink channel a request for assistance data for positioning; receive from the second UE through the first sidelink channel a first set of revised assistance data for positioning, wherein the first set of revised assistance data is generated by the second UE based on assistance data for positioning obtained by the second UE; and perform positioning based on the first set of revised assistance data.

Clause 75. The first UE of clause 74, wherein the first set of revised the assistance data is generated by the second UE by at least one of reprioritizing the assistance data, reordering the assistance data, reducing the assistance data, or a combination thereof.

Clause 76. The first UE of clause 75, wherein the second UE reprioritizes the assistance data by assigning new prioritization identifiers (IDs) that are different than prioritization IDs included in the assistance data for positioning.

Clause 77. The first UE of any of clauses 74-76, wherein the second UE is a communication relay UE for the first UE.

Clause 78. The first UE of any of clauses 74-77, wherein the first set of revised assistance data comprises at least one of downlink reference signal assistance data, sidelink reference signal assistance data, or a combination thereof.

Clause 79. The first UE of clause 78, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 80. The first UE of any of clauses 74-79, wherein the first set of revised the assistance data is generated by the second UE based on reference signal measurements performed by the second UE.

Clause 81. The first UE of any of clauses 74-80, wherein the at least one processor is further configured to send a measurement report to the second UE.

Clause 82. The first UE of any of clauses 74-81, wherein the at least one processor is configured to perform positioning based on the first set of revised assistance data by being configured to perform at least one of sidelink positioning using downlink positioning using downlink reference signals received from one or more base stations, sidelink reference signals received from one or more other UEs, or a combination thereof.

Clause 83. The first UE of any of clauses 74-82, wherein the at least one processor is further configured to: send to a third UE through a second sidelink channel a request for assistance data for positioning; receive from the third UE through the second sidelink channel a second set of revised assistance data for positioning, wherein the second set of revised assistance data is generated by the third UE based on assistance data for positioning the first UE obtained by the third UE; combine the first set of revised assistance data and the second set of revised assistance data to generate a combined set of assistance data; wherein performing positioning based on the first set of revised assistance data comprises performing positioning using the combined set of assistance data.

Clause 84. The first UE of clause 83, wherein the at least one processor is further configured to receive a first set of signal strength measurements from the second UE with the first set of revised assistance data and receive a second set of signal strength measurements from the third UE with the second set of revised assistance data, wherein the at least one processor is configured to combine the first set of revised assistance data and the second set of revised assistance data to generate the combined set of assistance data using the first set of signal strength measurements and the second set of signal strength measurements.

Clause 85. The first UE of any of clauses 83-84, wherein the at least one processor is further configured to receive a first indication of range between the second UE and the first UE with the first set of revised assistance data and receive a second indication of range between the third UE and the first UE with the second set of revised assistance data, wherein the at least one processor is configured to combine the first set of revised assistance data and the second set of revised assistance data to generate the combined set of assistance data using the first indication of range and the second indication of range.

Clause 86. The first UE of clause 85, wherein the first indication of range is a first zone identifier (ID) for the second UE and the second indication of range is a second zone ID for the third UE.

Clause 87. The first UE of any of clauses 83-86, wherein the at least one processor is configured to combine the first set of revised assistance data and the second set of revised assistance data to generate the combined set of assistance data using relative priorities of the second UE and the third UE.

Clause 88. The first UE of any of clauses 83-87, wherein the at least one processor is further configured to: send or receiving one or more messages to or from a location server in a wireless network to initiate a positioning session, wherein no assistance data is requested from the location server during the positioning session; wherein the at least one processor is configured to perform positioning using reference signals from one or more base stations in the wireless network.

Clause 89. The first UE of clause 88, wherein the positioning session is initiated after the combined set of assistance data is generated.

Clause 90. The first UE of clause 88, wherein the at least one processor is further configured to send a measurement report to the location server, wherein the measurement report includes a UE identifier for the second UE and the third UE.

Clause 91. A first user equipment (UE) configured for determining a position of the first UE, the first UE comprising: means for sending to a second UE through a first sidelink channel a request for assistance data for positioning; means for receiving from the second UE through the first sidelink channel a first set of revised assistance data for positioning, wherein the first set of revised assistance data is generated by the second UE based on assistance data for positioning obtained by the second UE; and means for performing positioning based on the first set of revised assistance data.

Clause 92. The first UE of clause 91, wherein the first set of revised the assistance data is generated by the second UE by at least one of reprioritizing the assistance data, reordering the assistance data, reducing the assistance data, or a combination thereof.

Clause 93. The first UE of clause 92, wherein the second UE reprioritizes the assistance data by assigning new prioritization identifiers (IDs) that are different than prioritization IDs included in the assistance data for positioning.

Clause 94. The first UE of any of clauses 91-93, wherein the second UE is a communication relay UE for the first UE.

Clause 95. The first UE of any of clauses 91-94, wherein the first set of revised assistance data comprises at least one of downlink reference signal assistance data, sidelink reference signal assistance data, or a combination thereof.

Clause 96. The first UE of clause 95, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 97. The first UE of any of clauses 91-96, wherein the first set of revised the assistance data is generated by the second UE based on reference signal measurements performed by the second UE.

Clause 98. The first UE of any of clauses 91-97, further comprising means for sending a measurement report to the second UE.

Clause 99. The first UE of any of clauses 91-98, wherein the means for performing positioning based on the first set of revised assistance data performs at least one of sidelink positioning using downlink positioning using downlink reference signals received from one or more base stations, sidelink reference signals received from one or more other UEs, or a combination thereof.

Clause 100. The first UE of any of clauses 91-99, further comprising: means for sending to a third UE through a second sidelink channel a request for assistance data for positioning; means for receiving from the third UE through the second sidelink channel a second set of revised assistance data for positioning, wherein the second set of revised assistance data is generated by the third UE based on assistance data for positioning the first UE obtained by the third UE; means for combining the first set of revised assistance data and the second set of revised assistance data to generate a combined set of assistance data; wherein the means for performing positioning based on the first set of revised assistance data performs positioning using the combined set of assistance data.

Clause 101. The first UE of clause 100, further comprising means for receiving a first set of signal strength measurements from the second UE with the first set of revised assistance data and means for receiving a second set of signal strength measurements from the third UE with the second set of revised assistance data, wherein the means for combining the first set of revised assistance data and the second set of revised assistance data to generate the combined set of assistance data uses the first set of signal strength measurements and the second set of signal strength measurements.

Clause 102. The first UE of any of clauses 100-101, further comprising means for receiving a first indication of range between the second UE and the first UE with the first set of revised assistance data and means for receiving a second indication of range between the third UE and the first UE with the second set of revised assistance data, wherein the means for combining the first set of revised assistance data and the second set of revised assistance data to generate the combined set of assistance data uses the first indication of range and the second indication of range.

Clause 103. The first UE of clause 102, wherein the first indication of range is a first zone identifier (ID) for the second UE and the second indication of range is a second zone ID for the third UE.

Clause 104. The first UE of any of clauses 100-103, wherein the means for combining the first set of revised assistance data and the second set of revised assistance data to generate the combined set of assistance data uses relative priorities of the second UE and the third UE.

Clause 105. The first UE of any of clauses 100-104, further comprising: means for sending or receiving one or more messages to or from a location server in a wireless network to initiate a positioning session, wherein no assistance data is requested from the location server during the positioning session; wherein the means for performing positioning uses reference signals from one or more base stations in the wireless network.

Clause 106. The first UE of clause 105, wherein the positioning session is initiated after the combined set of assistance data is generated.

Clause 107. The first UE of clause 105, further comprising means for sending a measurement report to the location server, wherein the measurement report includes a UE identifier for the second UE and the third UE.

Clause 108. A non-transitory storage medium including program code stored thereon, the program code is operable to configure at least one processor in a first user equipment (UE) for determining a position of the first UE, the program code comprising instructions to: send to a second UE through a first sidelink channel a request for assistance data for positioning; receive from the second UE through the first sidelink channel a first set of revised assistance data for positioning, wherein the first set of revised assistance data is generated by the second UE based on assistance data for positioning obtained by the second UE; and perform positioning based on the first set of revised assistance data.

Clause 109. The non-transitory storage medium of clause 108, wherein the first set of revised the assistance data is generated by the second UE by at least one of reprioritizing the assistance data, reordering the assistance data, reducing the assistance data, or a combination thereof.

Clause 110. The non-transitory storage medium of clause 109, wherein the second UE reprioritizes the assistance data by assigning new prioritization identifiers (IDs) that are different than prioritization IDs included in the assistance data for positioning.

Clause 111. The non-transitory storage medium of any of clauses 108-110, wherein the second UE is a communication relay UE for the first UE.

Clause 112. The non-transitory storage medium of any of clauses 108-111, wherein the first set of revised assistance data comprises at least one of downlink reference signal assistance data, sidelink reference signal assistance data, or a combination thereof.

Clause 113. The non-transitory storage medium of clause 112, wherein the downlink reference signal assistance data comprises at least one of reference signal resources, resource sets, frequency layers, or a combination thereof from one or more base stations, and the sidelink reference signal assistance data comprises at least one of reference signal resources, resource sets, frequency layers, or a combination thereof from one or more sidelink UEs.

Clause 114. The non-transitory storage medium of any of clauses 108-113, wherein the first set of revised the assistance data is generated by the second UE based on reference signal measurements performed by the second UE.

Clause 115. The non-transitory storage medium of any of clauses 108-114, further comprising instructions to send a measurement report to the second UE.

Clause 116. The non-transitory storage medium of any of clauses 108-115, wherein the instructions to perform positioning based on the first set of revised assistance data comprises instructions to perform at least one of sidelink positioning using downlink positioning using downlink reference signals received from one or more base stations, sidelink reference signals received from one or more other UEs, or a combination thereof.

Clause 117. The non-transitory storage medium of any of clauses 108-116, further comprising instructions to: send to a third UE through a second sidelink channel a request for assistance data for positioning; receive from the third UE through the second sidelink channel a second set of revised assistance data for positioning, wherein the second set of revised assistance data is generated by the third UE based on assistance data for positioning the first UE obtained by the third UE; combine the first set of revised assistance data and the second set of revised assistance data to generate a combined set of assistance data; wherein the instructions to perform positioning based on the first set of revised assistance data comprises instructions to perform positioning using the combined set of assistance data.

Clause 118. The non-transitory storage medium of clause 117, further comprising instructions to receive a first set of signal strength measurements from the second UE with the first set of revised assistance data and receive a second set of signal strength measurements from the third UE with the second set of revised assistance data, wherein the instructions to combine the first set of revised assistance data and the second set of revised assistance data to generate the combined set of assistance data uses the first set of signal strength measurements and the second set of signal strength measurements.

Clause 119. The non-transitory storage medium of any of clauses 117-118, further comprising instructions to receive a first indication of range between the second UE and the first UE with the first set of revised assistance data and receive a second indication of range between the third UE and the first UE with the second set of revised assistance data, wherein the instructions to combine the first set of revised assistance data and the second set of revised assistance data to generate the combined set of assistance data uses the first indication of range and the second indication of range.

Clause 120. The non-transitory storage medium of clause 119, wherein the first indication of range is a first zone identifier (ID) for the second UE and the second indication of range is a second zone ID for the third UE.

Clause 121. The non-transitory storage medium of any of clauses 117-120, wherein the instructions to combine the first set of revised assistance data and the second set of revised assistance data to generate the combined set of assistance data using relative priorities of the second UE and the third UE.

Clause 122. The non-transitory storage medium of any of clauses 117-121, further comprising instructions to: send or receiving one or more messages to or from a location server in a wireless network to initiate a positioning session, wherein no assistance data is requested from the location server during the positioning session; wherein the instructions to perform positioning uses reference signals from one or more base stations in the wireless network.

Clause 123. The non-transitory storage medium of clause 122, wherein the positioning session is initiated after the combined set of assistance data is generated.

Clause 124. The non-transitory storage medium of clause 122, further comprising instructions to send a measurement report to the location server, wherein the measurement report includes a UE identifier for the second UE and the third UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a first user equipment (UE) for determining a position of a second UE, the method comprising:

receiving from the second UE through a sidelink channel a request for assistance data for positioning the second UE;

obtaining assistance data for positioning;

revising the assistance data for positioning to produce revised assistance data; and sending to the second UE through the sidelink channel the revised assistance data for positioning the second UE.

2. The method of claim 1, wherein revising the assistance data comprises at least one of reprioritizing the assistance data, reordering the assistance data, reducing the assistance data, or a combination thereof.

3. The method of claim 1, wherein the first UE is a communication relay UE for the second UE.

4. The method of claim 1, wherein the assistance data for positioning comprises at least one of downlink reference signal assistance data, sidelink reference signal assistance data, or a combination thereof.

5. The method of claim 1, further comprising performing reference signal measurements, wherein revising the assistance data is based on the reference signal measurements.

6. The method of claim 1, wherein obtaining the assistance data for positioning the second UE comprises:

sending a request for assistance data to a location server; and receiving the assistance data from the location server.

7. The method of claim 1, wherein obtaining the assistance data for positioning the second UE comprises generating assistance data for sidelink positioning for the second UE.

8. The method of claim 1, further comprising obtaining an indication of range to between the first UE and the second UE, wherein the indication of range is sent to the second UE with the revised assistance data.

9. The method of claim 1, further comprising:

receiving a measurement report from the second UE; and sending the measurement report to a location server.

10. A first user equipment (UE) configured for determining a position of a second UE, the first UE comprising:

at least one wireless transceiver configured to wirelessly communicate with other entities in a wireless network;

at least one memory; and at least one processor coupled to the at least one wireless transceiver and the at least one memory and configured to:

receive from the second UE through a sidelink channel a request for assistance data for positioning the second UE;

obtain assistance data for positioning;

revise the assistance data for positioning to produce revised assistance data; and send to the second UE through the sidelink channel the revised assistance data for positioning the second UE.

11. The first UE of claim 10, wherein the at least one processor is configured to revise the assistance data by being configured to at least one of reprioritize the assistance data, reorder the assistance data, reduce the assistance data, or a combination thereof.

12. The first UE of claim 10, wherein the first UE is a communication relay UE for the second UE.

13. The first UE of claim 10, wherein the assistance data for positioning comprises at least one of downlink reference signal assistance data, sidelink reference signal assistance data, or a combination thereof.

14. The first UE of claim 10, wherein the at least one processor is further configured to perform reference signal measurements, wherein the at least one processor is configured to revise the assistance data based on the reference signal measurements.

15. The first UE of claim 10, wherein the at least one processor is configured to obtain the assistance data for positioning the second UE by being configured to:

send a request for assistance data to a location server; and receive the assistance data from the location server.

16. The first UE of claim 10, wherein the at least one processor is configured to obtain the assistance data for positioning the second UE by being configured to generate assistance data for sidelink positioning for the second UE.

17. The first UE of claim 10, wherein the at least one processor is further configured to obtain an indication of range to between the first UE and the second UE, wherein the indication of range is sent to the second UE with the revised assistance data.

18. The first UE of claim 10, wherein the at least one processor is further configured to:

receive a measurement report from the second UE; and send the measurement report to a location server.

19. A method performed by a first user equipment (UE) for determining a position of the first UE, the method comprising:

sending to a second UE through a first sidelink channel a request for assistance data for positioning;

receiving from the second UE through the first sidelink channel a first set of revised assistance data for positioning, wherein the first set of revised assistance data is generated by the second UE based on assistance data for positioning obtained by the second UE; and performing positioning based on the first set of revised assistance data.

20. The method of claim 19, wherein the first set of revised the assistance data is generated by the second UE by at least one of reprioritizing the assistance data, reordering the assistance data, reducing the assistance data, or a combination thereof.

21. The method of claim 19, wherein the second UE is a communication relay UE for the first UE.

22. The method of claim 19, wherein the first set of revised assistance data comprises at least one of downlink reference signal assistance data, sidelink reference signal assistance data, or a combination thereof.

23. The method of claim 19, wherein the first set of revised the assistance data is generated by the second UE based on reference signal measurements performed by the second UE.

24. The method of claim 19, further comprising sending a measurement report to the second UE.

25. The method of claim 19, wherein performing positioning based on the first set of revised assistance data comprises performing at least one of sidelink positioning using downlink positioning using downlink reference signals received from one or more base stations, sidelink reference signals received from one or more other UEs, or a combination thereof.

26. The method of claim 19, further comprising:

sending to a third UE through a second sidelink channel a request for assistance data for positioning;

receiving from the third UE through the second sidelink channel a second set of revised assistance data for positioning, wherein the second set of revised assistance data is generated by the third UE based on assistance data for positioning the first UE obtained by the third UE;

combining the first set of revised assistance data and the second set of revised assistance data to generate a combined set of assistance data;

wherein performing positioning based on the first set of revised assistance data comprises performing positioning using the combined set of assistance data.

27. A first user equipment (UE) configured for determining a position of the first UE, the first UE comprising:

at least one wireless transceiver configured to wirelessly communicate with entities in a wireless network;

at least one memory; and at least one processor coupled to the at least one wireless transceiver and the at least one memory and configured to:

send to a second UE through a first sidelink channel a request for assistance data for positioning;

receive from the second UE through the first sidelink channel a first set of revised assistance data for positioning, wherein the first set of revised assistance data is generated by the second UE based on assistance data for positioning obtained by the second UE; and perform positioning based on the first set of revised assistance data.

28. The first UE of claim 27, wherein the first set of revised the assistance data is generated by the second UE by at least one of reprioritizing the assistance data, reordering the assistance data, reducing the assistance data, or a combination thereof.

29. The first UE of claim 27, wherein the second UE is a communication relay UE for the first UE.

30. The first UE of claim 27, wherein the first set of revised assistance data comprises at least one of downlink reference signal assistance data, sidelink reference signal assistance data, or a combination thereof.

31. The first UE of claim 27, wherein the first set of revised the assistance data is generated by the second UE based on reference signal measurements performed by the second UE.

32. The first UE of claim 27, wherein the at least one processor is further configured to send a measurement report to the second UE.

33. The first UE of claim 27, wherein the at least one processor is configured to perform positioning based on the first set of revised assistance data by being configured to perform at least one of sidelink positioning using downlink positioning using downlink reference signals received from one or more base stations, sidelink reference signals received from one or more other UEs, or a combination thereof.

34. The first UE of claim 27, wherein the at least one processor is further configured to:

send to a third UE through a second sidelink channel a request for assistance data for positioning;

receive from the third UE through the second sidelink channel a second set of revised assistance data for positioning, wherein the second set of revised assistance data is generated by the third UE based on assistance data for positioning the first UE obtained by the third UE;

combine the first set of revised assistance data and the second set of revised assistance data to generate a combined set of assistance data;

wherein performing positioning based on the first set of revised assistance data comprises performing positioning using the combined set of assistance data.

* * * * *